(12) United States Patent
Yamaura

(10) Patent No.: US 9,344,222 B2
(45) Date of Patent: *May 17, 2016

(54) WIRELESS COMMUNICATION SYSTEM, WIRELESS COMMUNICATION APPARATUS AND WIRELESS COMMUNICATION METHOD

(71) Applicant: Sony Corporation, Tokyo (JP)

(72) Inventor: Tomoya Yamaura, Tokyo (JP)

(73) Assignee: Sony Corporation, Tokyo (JP)

( * ) Notice: Subject to any disclaimer, the term of this patent is extended or adjusted under 35 U.S.C. 154(b) by 57 days.

This patent is subject to a terminal disclaimer.

(21) Appl. No.: 14/248,481

(22) Filed: Apr. 9, 2014

(65) Prior Publication Data

US 2014/0219385 A1 Aug. 7, 2014

Related U.S. Application Data

(63) Continuation of application No. 13/958,418, filed on Aug. 2, 2013, now Pat. No. 8,730,904, which is a continuation of application No. 13/460,894, filed on May 1, 2012, now Pat. No. 8,744,371, which is a continuation of application No. 11/790,593, filed on Apr. 26, 2007, now Pat. No. 8,194,720.

(30) Foreign Application Priority Data

Apr. 27, 2006 (JP) ................................. 2006-124538
Mar. 6, 2007 (JP) ................................. 2007-056245

(51) Int. Cl.
*H04L 1/06* (2006.01)
*H04B 7/04* (2006.01)
(Continued)

(52) U.S. Cl.
CPC .............. *H04L 1/0681* (2013.01); *H04B 7/043* (2013.01); *H04B 7/0413* (2013.01);
(Continued)

(58) Field of Classification Search
CPC .. H04B 7/0421; H04B 7/0417; H04B 7/0413; H04L 1/0681; H04L 1/0625; H04L 1/06
See application file for complete search history.

(56) References Cited

U.S. PATENT DOCUMENTS 6,418,175 B1 7/2002 Pukkila et al.
6,687,492 B1 2/2004 Sugar et al.
(Continued)

FOREIGN PATENT DOCUMENTS

EP 1 598 955 A2 11/2005
EP 2 011 250 A 11/2007
(Continued)

OTHER PUBLICATIONS

Extended European Search Report dated Feb. 12, 2010 corresponding to European Application No. EP 07 25 1773, 7 pages.
(Continued)

*Primary Examiner* — Myron K Wyche
(74) *Attorney, Agent, or Firm* — Wolf, Greenfield & Sacks, P.C.

(57) ABSTRACT

A wireless communication system which performs data transmission using spatially multiplexed streams from a first terminal including N antennas to a second terminal including M antennas (N is an integer of 2 or more and M is an integer of 1 or more) is disclosed. The system includes notifying means, training means, channel matrix estimation means, beamforming information feedback means, transmission weight matrix setting means, and beamforming means.

39 Claims, 13 Drawing Sheets

(51) Int. Cl.
  *H04B 7/06* (2006.01)
  *H04L 25/02* (2006.01)
  *H04L 25/03* (2006.01)
  *H04L 27/26* (2006.01)

(52) U.S. Cl.
  CPC .......... *H04B 7/0417* (2013.01); *H04B 7/0421* (2013.01); *H04B 7/0456* (2013.01); *H04B 7/0626* (2013.01); *H04B 7/0628* (2013.01); *H04B 7/0643* (2013.01); *H04L 1/0625* (2013.01); *H04L 25/022* (2013.01); *H04L 25/0204* (2013.01); *H04L 25/03159* (2013.01); *H04L 27/2601* (2013.01); *H04L 25/0242* (2013.01); *H04L 2025/03414* (2013.01); *H04L 2025/03426* (2013.01)

(56) References Cited

U.S. PATENT DOCUMENTS

| | | |
|---|---|---|
| 6,859,503 B2 | 2/2005 | Pautler et al. |
| 7,068,628 B2 | 6/2006 | Li et al. |
| 7,099,678 B2 | 8/2006 | Vaidyanathan |
| 7,110,378 B2 | 9/2006 | Onggosanusi et al. |
| 7,248,645 B2 | 7/2007 | Vialle et al. |
| 7,272,162 B2 | 9/2007 | Sano et al. |
| 7,295,542 B2 | 11/2007 | Xu |
| 7,433,416 B1 | 10/2008 | Banister |
| 7,486,720 B2 | 2/2009 | Molisch et al. |
| 7,508,880 B2 | 3/2009 | Yun et al. |
| 7,570,696 B2 | 8/2009 | Maltsev et al. |
| 7,636,573 B2 | 12/2009 | Walton et al. |
| 7,706,324 B2 | 4/2010 | Sutivong et al. |
| 7,746,943 B2 | 6/2010 | Yamaura |
| 7,756,210 B2 | 7/2010 | Castelain et al. |
| 7,773,685 B2 | 8/2010 | Tirkkonen et al. |
| 7,848,444 B2 * | 12/2010 | Yamaura ............... H04B 7/0421 375/260 |
| 7,949,060 B2 | 5/2011 | Ling et al. |
| 8,194,720 B2 | 6/2012 | Yamaura |
| 8,243,749 B2 | 8/2012 | Basson et al. |
| 8,260,198 B2 | 9/2012 | Yamaura |
| 8,345,732 B2 | 1/2013 | Fischer et al. |
| 8,369,790 B2 | 2/2013 | Li et al. |
| 8,374,096 B2 | 2/2013 | Gu et al. |
| 8,532,569 B2 | 9/2013 | Yamaura |
| 8,699,405 B2 * | 4/2014 | Yamaura ............... H04B 7/0417 370/277 |
| 8,699,477 B2 | 4/2014 | Yamaura |
| 8,706,028 B2 | 4/2014 | Yamaura |
| RE45,150 E | 9/2014 | Yamaura |
| 8,830,846 B2 | 9/2014 | Grandhi et al. |
| 8,964,521 B2 | 2/2015 | Hansen et al. |
| 2003/0003880 A1 | 1/2003 | Ling et al. |
| 2004/0178954 A1 | 9/2004 | Vook et al. |
| 2004/0192218 A1 | 9/2004 | Oprea |
| 2004/0199056 A1 | 10/2004 | Husemann et al. |
| 2005/0043031 A1 | 2/2005 | Cho et al. |
| 2005/0053170 A1 | 3/2005 | Catreux et al. |
| 2005/0090205 A1 | 4/2005 | Catreux-Erceg et al. |
| 2005/0213682 A1 | 9/2005 | Han et al. |
| 2006/0039328 A1 | 2/2006 | Ihm et al. |
| 2006/0056316 A1 | 3/2006 | Chandra et al. |
| 2006/0067718 A1 | 3/2006 | Toda et al. |
| 2006/0068718 A1 | 3/2006 | Li et al. |
| 2006/0068738 A1 | 3/2006 | Li et al. |
| 2006/0121946 A1 | 6/2006 | Walton et al. |
| 2006/0172707 A1 | 8/2006 | Stern-Berkowitz et al. |
| 2006/0250963 A1 | 11/2006 | Jin et al. |
| 2006/0270343 A1 | 11/2006 | Cha et al. |
| 2006/0291544 A1 | 12/2006 | Fischer et al. |
| 2006/0291581 A1 | 12/2006 | Onggosanusi et al. |
| 2007/0111666 A1 | 5/2007 | Waxman |
| 2007/0160010 A1 | 7/2007 | Maltsev et al. |
| 2007/0160162 A1 | 7/2007 | Kim et al. |
| 2007/0189412 A1 | 8/2007 | Xia et al. |
| 2007/0191066 A1 | 8/2007 | Khojastepour et al. |
| 2007/0201566 A1 | 8/2007 | Solomon et al. |
| 2007/0201575 A1 | 8/2007 | Ariyavisitakul et al. |
| 2007/0253501 A1 | 11/2007 | Yamaura |
| 2007/0258541 A1 | 11/2007 | Yamaura |
| 2008/0108310 A1 | 5/2008 | Tong et al. |
| 2008/0113626 A1 | 5/2008 | Kim et al. |
| 2008/0212538 A1 | 9/2008 | Molisch |
| 2008/0261551 A1 | 10/2008 | Catreux-Erceg et al. |
| 2009/0161641 A1 | 6/2009 | Kim |
| 2009/0207765 A1 | 8/2009 | Yamaura |
| 2009/0290563 A1 | 11/2009 | Gu et al. |
| 2011/0075606 A1 | 3/2011 | Yamaura |
| 2011/0310996 A1 | 12/2011 | Raleigh et al. |
| 2012/0213300 A1 | 8/2012 | Yamaura |
| 2012/0269158 A1 | 10/2012 | Yamaura |
| 2012/0281631 A1 | 11/2012 | Yamaura |
| 2013/0129000 A1 | 5/2013 | Fischer et al. |
| 2013/0315177 A1 | 11/2013 | Yamaura et al. |
| 2013/0315222 A1 | 11/2013 | Yamaura et al. |
| 2013/0315330 A1 | 11/2013 | Yamaura et al. |
| 2013/0315331 A1 | 11/2013 | Yamaura et al. |
| 2013/0315332 A1 | 11/2013 | Yamaura et al. |
| 2013/0315333 A1 | 11/2013 | Yamaura et al. |
| 2013/0315334 A1 | 11/2013 | Yamaura et al. |
| 2013/0315335 A1 | 11/2013 | Yamaura et al. |
| 2013/0322379 A1 | 12/2013 | Yamaura et al. |
| 2013/0343369 A1 | 12/2013 | Yamaura et al. |
| 2014/0219378 A1 | 8/2014 | Yamaura |
| 2014/0254578 A1 | 9/2014 | Yamaura |

FOREIGN PATENT DOCUMENTS

| | | |
|---|---|---|
| JP | 2002-44051 | 2/2002 |
| JP | 2004-23716 | 1/2004 |
| JP | 2007-318727 | 12/2007 |
| JP | 2007-318728 | 12/2007 |
| JP | 2007-318729 | 12/2007 |
| JP | 4356756 | 8/2009 |
| JP | 4775288 | 7/2011 |
| WO | WO 2006/129958 A1 | 12/2006 |
| WO | WO 2007/126036 A1 | 11/2007 |

OTHER PUBLICATIONS

[No Author Listed].http://radio3.ee.uec.ac.jp/MIMO(IEICE.sub.—TS).pdf. Oct 24, 2003;:32-5.

Benjebbour et al., Comparison of Ordered Successive Receivers for Space-Time Transmission. Proc IEEE VTC. 2001;4:2053-7.

Benjebbour et al., Performance of Iterative Successive Detection Algorithm for Space-Time Transmission. Proc IEEE VTC. May 2001;2:1287-91.

Benko et al., A PHY/MAC Proposal for IEEE 802.22 WRAN Systems. Feb. 23, 2006. Doc. No. IEE 802.22-06/0005r3.

Ohwatari et al., A Study on Reduction of the Amount of Channel State Information Feedback in MIMO-OFDM Eigenbeam-Space Division Multiplexing Systems. IEICE Technical Report RCS2006-7. 2006;:1-14.

Tomcik, QFDD and QTDD: Technology Overview. IEEE 802.20 Working Group on Mobile Broadband Wireless Access. Oct. 28, 2005. Doc No. IEE C802.20-05/68.

Chinese Office Action and English translation thereof dated Oct. 10, 2014 in connection with Application No. 201210206360.8.

Stephens et al., Joint Proposal: High Throughput Extension to the 802.11 Standard: MAC, IEEE 802.11-05/1095r4, Jan. 13, 2006, pp. 1-103.

Xia et al. Analysis of Transmit Beamforming in IEEE 802.11 in Systems, IEEE Global Telecommunications Conference, 2006, pp. 1-5.

U.S. Appl. No. 60/780,623, filed Mar. 9, 2006, Chandra et al.

\* cited by examiner

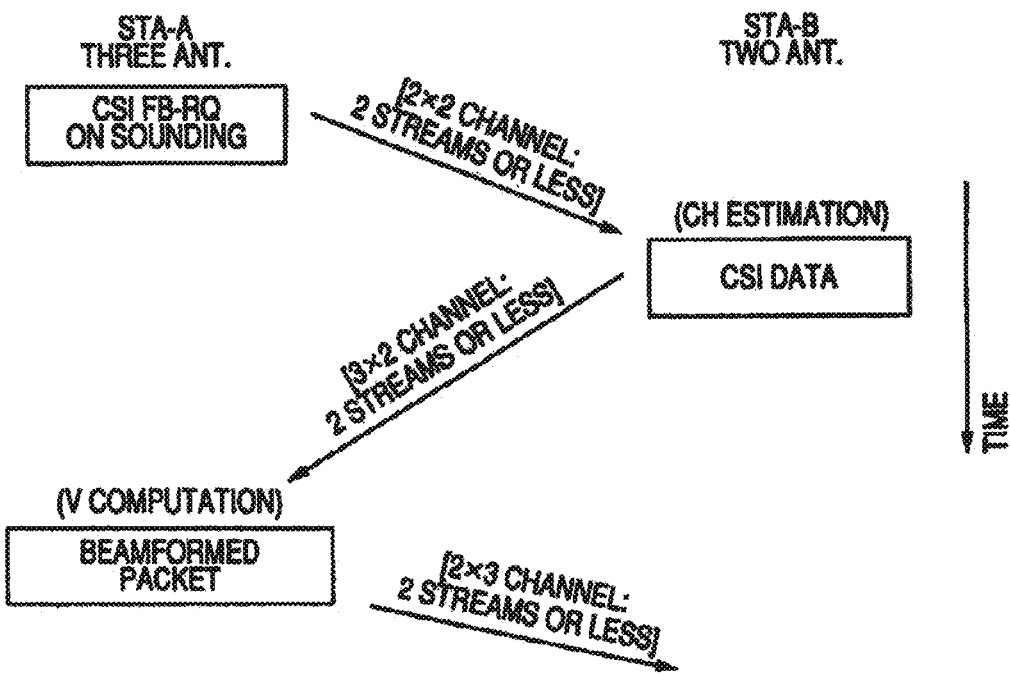
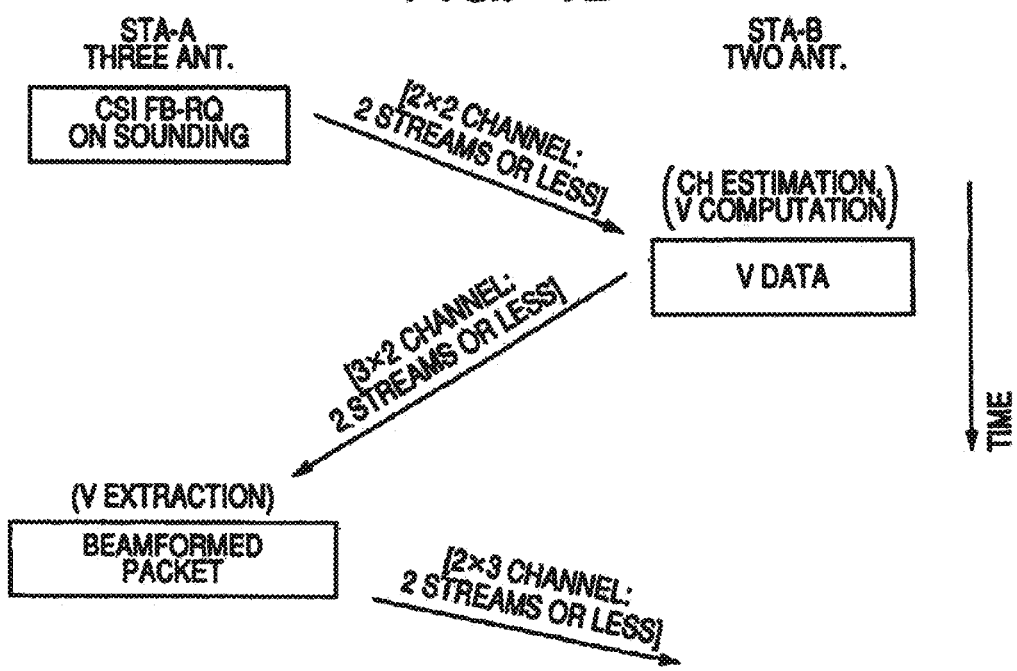

FIG. 16

| B0-B15 | B16-B17 | B18-B19 | B20-B21 | B22-B23 | B24 | B25-B29 | B30 | B31 |
|---|---|---|---|---|---|---|---|---|
| LINK ADAPTATION CONTROL | CALIBRATION POSITION | CALIBRATION SEQUENCE | FEEDBACK REQUEST | CSI/ STEERING | ZLF ANNOUNCEMENT | RESERVED | AC CONSTRAINT | RDG/MORE PPDU |
| 16 | 2 | 2 | 2 | 2 | 1 | 5 | 1 | 1 |

BITS

FIG. 17

| FIELD | MEANING | DEFINITION |
|---|---|---|
| CSI/STEERING | TYPE OF FEEDBACK | 00 CSI<br>01 UNCOMPRESSED STEERING MATRIX<br>10 COMPRESSED STEERING MATRIX<br>11 - RESERVED |

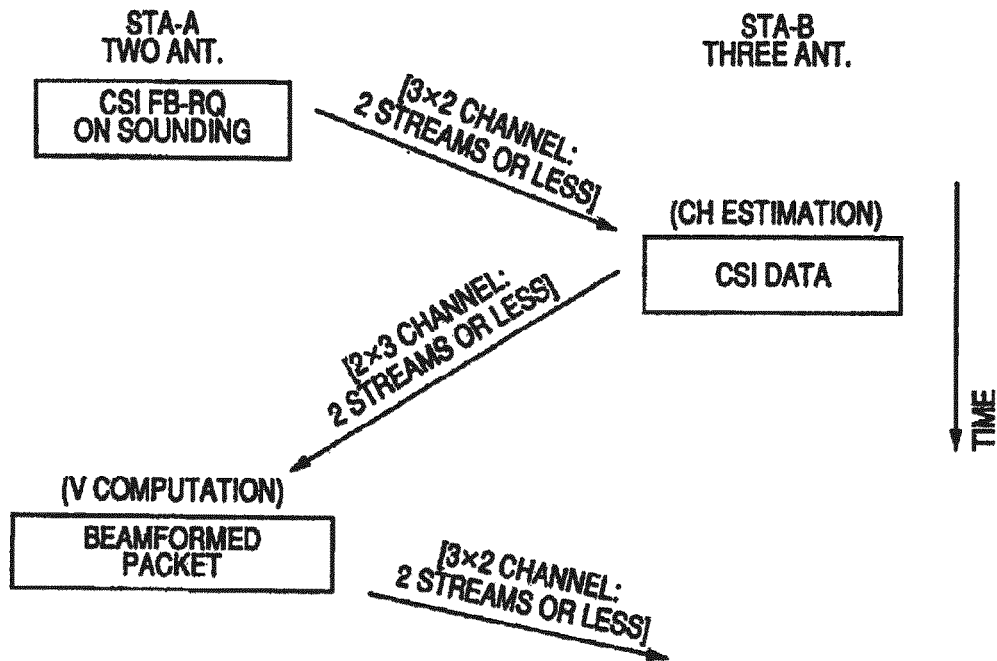
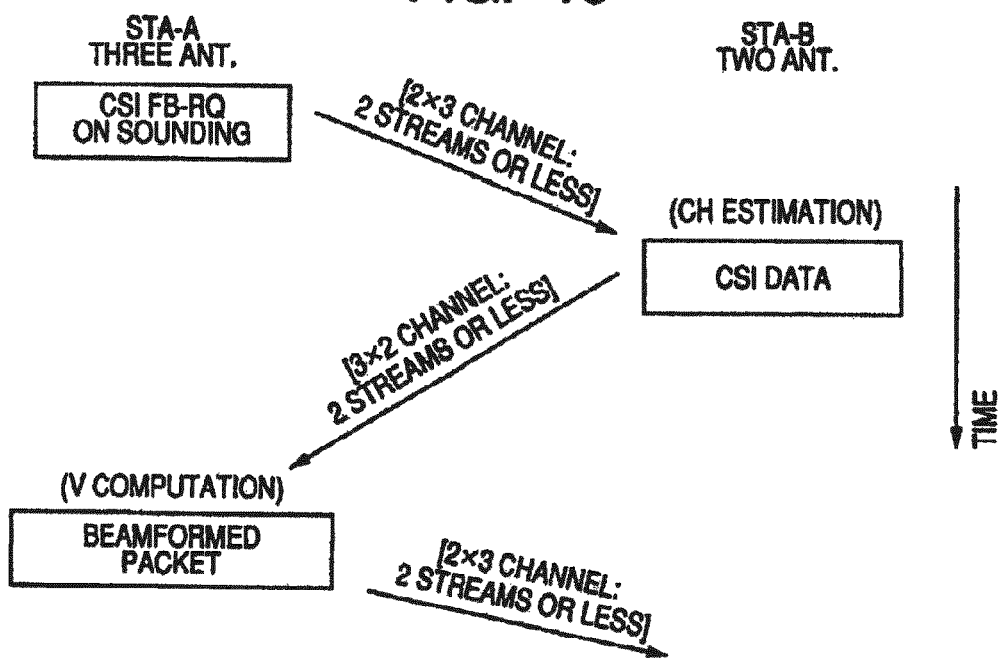

WIRELESS COMMUNICATION SYSTEM, WIRELESS COMMUNICATION APPARATUS AND WIRELESS COMMUNICATION METHOD

CROSS REFERENCES TO RELATED APPLICATIONS

This application is a continuation of and claims the benefit under 35 U.S.C. §120 of U.S. patent application Ser. No. 13/958,418, titled "WIRELESS COMMUNICATION SYSTEM, WIRELESS COMMUNICATION APPARATUS AND WIRELESS COMMUNICATION METHOD," filed on Aug. 2, 2013, which is a continuation of and claims the benefit under 35 U.S.C. §120 of U.S. patent application Ser. No. 13/460,894, filed on May 1, 2012, which is a continuation of and claims the benefit under 35 U.S.C. §120 of U.S. patent application Ser. No. 11/790,593, filed on Apr. 26, 2007, which claims the benefit under 35 U.S.C. §119 of Japanese Patent Application JP 2007-056245, filed on Mar. 6, 2007, and Japanese Patent Application JP 2006-124538, filed on Apr. 27, 2006. The entire contents of these applications are hereby incorporated by reference in their entireties.

BACKGROUND

1. Technical Field

The invention relates to a wireless communication system, a wireless communication apparatus and a wireless communication method using spatial multiplexing, and more particularly, to a wireless communication system, a wireless communication apparatus and a wireless communication method, in which a transmitter and a receiver share channel information to perform closed loop type spatial multiplexing transmission.

In particular, the invention relates to a wireless communication system, a wireless communication apparatus and a wireless communication method, which perform beamforming on the basis of information which is fed back from a receiver when a transmitter transmits a packet, and more particularly, to a wireless communication system, a wireless communication apparatus and a wireless communication method, which perform beamforming by feeding back beamforming information between a beamformer and beamformee which are different from each other in the number of antennas or the number of supported streams.

2. Background Art

As a system for removing wire in an existing wired communication method, a wireless network is attracting attention. A standard of the wireless network may be the IEEE (The institute of Electrical and Electronics Engineers) 802.11 or the IEEE 802.15.

For example, in the IEEE 802.11a/g, as a standard of a wireless LAN, an orthogonal frequency division multiplexing (OFDM) modulation method which is one of a multi-carrier method is employed. In the OFDM modulation method, since transmission data is distributed to a plurality of carriers having orthogonal frequencies and is transmitted, the band of each carrier becomes narrow, frequency use efficiency is very high, and frequency-selective fading interference is strong.

In addition, in the IEEE 802.11a/g standard, a modulation method for accomplishing a communication speed of a maximum of 54 Mbps is supported, but a next-generation wireless LAN standard for realizing a new high bit rate is required.

As one of a technology of realizing a high speed of wireless communication, multi-input multi-output (MIMO) communication is attracting attention. This is a communication method in which both a transmitter side and a receiver side respectively include a plurality of antennas to realize spatially multiplexed streams. The transmitter side performs spatial/temporal encoding and multiplexing of plural pieces of transmission data and distributes and transmits the plural pieces of transmission data to N transmission antennas through channels. The receiver side performs spatial/temporal decoding of reception signals received by M reception antennas through the channels to obtain reception data without crosstalk between the streams (for example, see JP-A-2002-44051 (Patent Document 1)). Ideally, spatial streams corresponding to the smaller number (MIN[N, M]) of the transmission and reception antennas are formed.

According to the MIMO communication method, a transmission capacity can increase according to the number of antennas and a communication speed improvement can be realized, without increasing a frequency band. Since the spatial multiplexing is used, frequency use efficiency is high. The MIMO method uses channel characteristics and is different from a simple transmission/reception adaptive array. For example, in the IEEE 802.11n which is the extension standard of the IEEE 802.11a/g, an OFDM_MIMO method using OFDM in primary modulation is employed. Currently, the IEEE 802.11n is being standardized in a task group n(TGn) and a specification established therein is based on a specification established in Enhanced wireless consortium (EWC) formed on October, 2005.

In the MIMO communication, in order to spatially divide a spatially multiplexed reception signal y into the stream signals x, a channel matrix H is acquired by any method and the spatially multiplexed reception signal needs to be spatially divided into a plurality of original streams using the channel matrix H by a predetermined algorithm.

The channel matrix H is obtained by allowing a transmitter/receiver side to transmit/receive existing training sequence, estimating the channels by a difference between the actually received signal and the existing sequence and arranging propagation channels of a combination of transmission and reception antennas in a matrix form. When the number of transmission antennas is N and the number of reception antennas is M, the channel matrix is M×N (row×column) matrix. Accordingly, the transmitter side transmits N training sequence and the receiver side acquires the channel matrix H using the received training sequence.

A method of spatially dividing a reception signal is largely classified into an open loop type method in which a receiver independently performs spatial division on the basis of the channel matrix H and a closed loop type method in which a transmitter side gives weights to the transmission antennas on the basis of the channel matrix to perform adequate beamforming toward a receiver to form an ideal spatial orthogonal channel.

As an open loop type MIMO transmission method, there is a zero force (for example, see A. Benjebbour, H. Murata and S. Yoshida, "Performance of iterative successive detection algorithm for space-time transmission", Proc. IEEE VTC Spring, vol. 2, pp. 1287-1291, Rhodes. Greece, May 2001 (Non-Patent Document 2)) or a minimum mean square error (MMSE) (for example, see A. Benjebbour, H. Murata and S. Yoshida, "Performance comparison of ordered successive receivers for space-time transmission", Proc. IEEE VTC Fall, vol. 4, pp. 2053-2057, Atlantic City, USA, September 2001 (Non-Patent Document 3)). The open loop type MIMO transmission method is a relative simple algorithm for obtaining reception weight matrix W for spatially dividing the reception signal from the channel matrix H, in which a feedback operation for sharing the channel information between the transmitter and the receiver is omitted and the transmitter and the receiver independently perform spatial multiplexing transmission.

As an ideal one of a closed loop type MIMO transmission method, a singular value decomposition (SVD)-MIMO method using SVD of the channel matrix H is known (for example, see http://radio3.ee.uec.ac.jp/MIMO(IEICE_TS).Pdf (Oct. 24, 2003) (Non-Patent Document 1)). In the SVD-MIMO transmission, a numerical matrix having channel information corresponding to antenna pairs as elements, that is, a channel information matrix H, is subjected to the singular value decomposition to obtain $UDV^H$. A transmitter side uses V in a transmission antenna weight matrix and transmits a beamformed packet to a receiver and a receiver side typically gives $(UD)^{-1}$ as a reception antenna weight matrix. Here, D is a diagonal matrix having square roots of singular values $\lambda_i$ corresponding to qualities of the spatial streams in diagonal elements (the subscript i indicates an $i^{th}$ spatial stream). The singular values $\lambda_i$ are arranged in the diagonal elements of the diagonal matrix D in ascending order and power ratio distribution or modulation method allocation is performed according to communication quality represented by the level of the singular value with respect to the streams such that a plurality of spatial orthogonal multiplexed propagation channels which are logically independent are realized. The receiver side can extract a plurality of original signal sequence without crosstalk and theoretically accomplish maximum performance.

In the closed loop type MIMO communication system, adequate beamforming is performed when the transmitter transmits the packet, but information on the channel information needs to be fed back from the receiver side for receiving the packet.

For example, in the EWC HT (High Throughput) MAC (Media Access Control) Specification Version V1.24, two kinds of procedures, that is, "implicit feedback" and "explicit feedback", are defined as the procedure for feeding back the information on the channel matrix between the transmitter and the receiver.

In the "implicit feedback", the transmitter estimates a backward channel matrix from the receiver to the transmitter using training sequence transmitted from the receiver, and a forward channel matrix from the transmitter to the receiver is computed to perform beamforming on the assumption that bidirectional channel characteristics between the transmitter and the receiver are reciprocal.

In the "explicit feedback", the receiver estimates a forward channel matrix from the transmitter to the receiver using training sequence transmitted from the transmitter and returns a packet including the channel matrix as data to the transmitter, and transmitter performs the beamforming using the received channel matrix. Alternatively, the receiver computes a transmission weight matrix for allowing the transmitter to perform the beamforming from the estimation channel matrix and returns a packet including the transmission weight matrix as the data to the transmitter. In the explicit feedback, since the weight matrix is computed on the basis of the estimated forward channel matrix, it may not be assumed that the channels are reciprocal.

In view of packet transmission, the transmitter is an initiator and the receiver is a receiver. However, in view of beamforming, the initiator for transmitting the packet is a beamformer and the receiver for receiving the beamformed packet is a beamformee. Communication from the beamformer to the beamformee is referred to as "forward" and communication from the beamformee to the beamformer is referred to as "backward". For example, when an access point (AP) transmits a data frame to a client terminal (STA) as the beamformer, the access point perform the beamforming on the basis of the channel information transmitted from the client in the explicit feedback.

FIG. 14 shows a state where the beamformee estimates the channel matrix excited by a training signal transmitted from the beamformer. In the same drawing, a STA-A having three antennas is the beamformer and a STA-B having two antennas is the beamformee and feedback is performed on the basis of a CSI format. In the below-described description or equations, a subscript AB indicates forward transmission from the STA-A to the STA-B. A numerical subscript corresponds to the antenna number of the corresponding terminal.

The training sequence transmitted from the antennas of the STA-A are ($t_{AB1}$, $t_{AB2}$, $t_{AB3}$) and the signals received by the antennas of the STA-A through a channel $H_{AB}$ are ($r_{AB1}$, $r_{AB2}$), the following equation is obtained.

$$\begin{pmatrix} r_{AB1} \\ r_{AB2} \end{pmatrix} = H_{AB} \begin{pmatrix} t_{AB1} \\ t_{AB2} \\ t_{AB3} \end{pmatrix} \quad (1)$$

where, the channel matrix $H_{AB}$ is a 2×3 matrix and expressed by the following equation. But, $h_{ij}$ is a channel characteristic value of $J^{th}$ antenna of the STA-A to $i^{th}$ antenna of the STA-B.

$$H_{AB} = \begin{pmatrix} h_{11} & h_{12} & h_{13} \\ h_{21} & h_{22} & h_{23} \end{pmatrix} \quad (2)$$

When the channel matrix $H_{AB}$ is subjected to singular value decomposition, the following equation is obtained. Here, $U_{AB}$ is a matrix having an inherent normalized vector of $H_{AB}H_{AB}{}^H$, $V_{AB}$ is an inherent normalized vector of $H_{AB}{}^H H_{AB}$ and $D_{AB}$ is a diagonal matrix having a square root of an inherent vector of $H_{AB}H_{AB}{}^H$ or $H_{AB}{}^H H_{AB}$ as the diagonal elements. In addition, $U_{AB}$ and $V_{AB}$ are unitary matrices and complex conjugate transposed matrices thereof become inverse matrices.

$$H_{AB} U_{AB} D_{AB} V_{AB}{}^H \quad (3)$$

The transmission weight matrix necessary for forming the frame transmitted from the STA-A to the STA-B is the matrix $V_{AB}$ obtained by performing the singular value decomposition with respect to the forward channel matrix $H_{AB}$. When the beamformee receives a sounding packet, the beamformee divides the sounding packet into spatial stream trainings to construct the estimation channel matrix $H_{AB}$. The CSI composed of MIMO channel coefficients $h_{11}$, $h_{12}$, ... which are elements of the channel matrix is collected and fed back to the STA-A.

If a transmission vector composed of transmission signals of the antennas of the STA-A is x and a reception signal of the STA-B is y, the reception signal becomes y=$H_{AB}$x in a case where the beamforming is not performed (un-steered), but the reception signal y becomes the following equation in a case where the beamforming are performed by the transmission weight matrix $V_{AB}$ (steered).

$$y = H_{AB} V_{AB} x = (U_{AB} D_{AB} V_{AB}^H) \cdot V_{AB} x = U_{AB} D_{AB} x \quad (4)$$

Accordingly, the STA-B can perform spatial division to the original stream by multiplying a reception vector including the reception signals of the antennas by $D_{AB}^{-1}U_{AB}^{H}$ as a reception weight.

FIG. 15 shows a frame exchange procedure for transmitting beamforming from the access point to the client terminal by the explicit feedback.

This procedure is initiated by the access point which sends the sounding packet including a CSI feedback request.

The sounding packet includes the training sequence excited by the channel matrix. Accordingly, when the sounding packet is received, the client terminal divides the spatial stream training to estimate the channel matrix H and collects the CSI. The CSI data is included in the packet as a CSI feedback (CFB) and returned to the access point.

The access point computes the transmission weight matrix for beamforming from the received CFB and multiplies the transmission signal by it to transmit the beamformed packet to the client terminal. Even in a place where the communication was hard to be accomplished in the past, communication is accomplished at a high transmission rate by the beamforming.

As described above, in the explicit feedback, the beamformer can receive the explicit feedback of the estimation channel matrix from the beamformee. The format of the feedback format of the estimation channel matrix is largely classified into a case where an MIMO channel coefficient is sent and a case where a transmission weight matrix V for beamforming computed by the beamformee.

The former format is called channel state information (CSI). The beamformer needs to compute the transmission weight matrix V for beamforming by constructing the channel matrix H from the received CSI and performing the singular value decomposition.

The latter is classified into a case where the transmission weight matrix V for beamforming is sent in an uncompressed format and a case where the transmission weight matrix V for beamforming is sent in a compressed format. According to the explicit feedback, a processing burden for estimating the channel matrix in the beamformer side and a processing burden for calculating the transmission weight matrix from the channel matrix are reduced.

FIG. 16 shows a scheme of a HT control field of an MAC frame defined in the EWC specification. The HTC field has 32 bits, but, among them, $22^{nd}$ to $23^{rd}$ CSI/steering fields can specify a feedback type received from the beamformee in the explicit feedback (see FIG. 17).

As described above, the processing burden of the beamformer which performs beamforming with respect to a transmission frame is reduced by the explicit feedback. However, when the beamformer and the beamformee are different from each other in the number of antennas or the number of supported streams, several problems are caused at the time of beamforming.

In a spatial multiplexing type communication apparatus, the dimension number which is allowed by the processing capability including the estimation of the channel matrix H, the computation of the transmission weight matrix for beamforming, and the multiplication of the transmission vector and the transmission weight matrix V for beamforming is generally designed according to the number of antennas included therein. Accordingly, the transmission weight matrix for beamforming cannot be constructed by spatially dividing a training signal transmitted from the beamformer having the number of antennas which is larger than an allowable dimension, the transmission weight matrix for beamforming cannot be computed from the channel matrix which is fed back from the beamformee, or the transmission weight matrix for beamforming which is fed back from the beamformee cannot be multiplied with the transmission vector.

First, consider a case where the explicit feedback is performed with a CSI format.

In a case where the number N of antennas of the STA-A is smaller than or equal to the number M of antennas of the STA-B, no problem is specially caused in the beamformee side. FIG. 18 shows a state where the explicit feedback is performed with a CSI format when N=2 and M=3. The STA-B includes a processing capability of M streams, and can estimate an M×N channel matrix excited by a training signal including N streams and feed back the collected CSI information to the STA-A. The STA-A side can suppress the feedback M×N channel matrix to a range of N rows and compute the transmission weight matrix for beamforming by the singular value decomposition from the N×N channel matrix.

However, in a case of N>M, problems are caused. This is because, when the STA-B can process only M streams, the STA-B obtains only M×M estimation channel matrix using M packets although the STA-A side transmits the sounding packet for exciting N-dimensional spatial channel matrix. FIG. 19 shows a state where the explicit feedback is performed with the CSI format when N=3 and M=2.

In the EWC specification, when the explicit feedback is applied, a scheme of informing information on channel estimation maximum dimension is defined as one of the capabilities of the beamformee side. It is defined that the HT terminal corresponding to high-speed transmission declares that it itself is the HT terminal by including a HT capability field in a predetermined management frame.

FIG. 20 shows a format of a HT capability element. In a TxBF (transmit beamforming) capability field, any HT function of the beamforming is specified. FIG. 21 shows the configuration of the Tx beamforming capability field. The Tx beamforming capability field has 32 bits, but, among them, $19^{th}$ to $20^{th}$ bits are allocated to the CSI number of beamformer antennae, $21^{st}$ to $22^{nd}$ bits are allocated to the uncompressed steering matrix of beamformer antennae, and $23^{rd}$ to $24^{th}$ bits are allocated to the compressed steering matrix of beamformer antennae. In these fields, the spatial dimension number of the sounding packet which can be received from the beamformer when the beamformee performs the explicit feedback with each format is described.

However, in the EWC specification, since it is not defined which sounding packet is transmitted by the beamformer, the STA-A may transmit the sounding packet for exciting more than M channels even when the STA-B informs of its own maximum dimension number by the above-described scheme and thus the STA-B is forced to estimate M×N channel matrix.

As a method of solving such problems without deteriorating the beamforming characteristics, it may be considered that a channel estimation maximum dimension $N_{max}$ corresponding to a rated maximum number of antennas is given to the STA-B as the beamformee (for example, if it is based on the IEEE specification, $N_{max}=4$).

For example, when the number of antennas of the STA-B is M=2 and the rated maximum number of antennas is $N_{max}=4$, the STA-B can compute only a 2×2 matrix in consideration of the communication with the terminal having the same number of antenna, but needs to compute a 2×4 matrix. In this case, since calculation or processing circuit needs to be doubled, miniaturization or low cost of the apparatus is hard to be realized.

The same is also applied to the explicit feedback for feeding back the transmission weight matrix V for beamforming, instead of the CSI format.

In a case where the number N of antennas of the STA-A is smaller than or equal to the number M of antennas of the STA-B, no problem is specially caused in the beamformee side. FIG. 22 shows a state where the transmission weight matrix V for beamforming is fed back by the explicit feedback when N=2 and M=3. The STA-B includes a processing capability of M streams, and can estimate an M×N channel matrix excited by a training signal including N streams, compute an N×M transmission weight matrix V for beamforming by the singular value decomposition from the estimation channel matrix, and feed backs the transmission weight matrix information to the STA-A. The STA-A side can perform beamforming using the fed-back transmission weight matrix for beamforming.

However, in a case of N>M, problems are caused. This is because, when the STA-B can process only M streams, the STA-B obtains only an M×M estimation channel matrix using M packets although the STA-A side transmits the sounding packet for exciting N-dimensional spatial channel matrix. FIG. 23 shows a state where the transmission weight matrix V is fed back by the explicit feedback when N=3 and M=2.

In the EWC specification, when the explicit feedback is applied, a scheme of informing information on channel estimation maximum dimension is defined as one of the capabilities of the beamformee side (described above). However, the STA-A may transmit the sounding packet for exciting more than M channels even when the STA-B informs of its own maximum dimension number by the above-described scheme and thus the STA-B is forced to estimate M×N channel matrix.

As a method of solving such a problem without deteriorating the beamforming characteristics, it may be considered that a channel estimation maximum dimension $N_{max}$ corresponding to a rated maximum number of antennas is given to the STA-B as the beamformee (for example, if it is based on the IEEE specification, $N_{max}$=4) and a processing capability which can compute the transmission weight matrix for beamforming is given to the obtained $N_{max}$×N estimation channel matrix.

For example, when the number of antennas of the STA-B is M=2 and the rated maximum number of antennas is $N_{max}$=4, the STA-B can compute only a 2×2 matrix in consideration of the communication with the terminal having the same number of antenna, but must compute a 2×4 matrix. In this case, since calculation or processing circuit needs to be doubled, miniaturization, low cost and low power consumption of the apparatus are hard to be realized.

SUMMARY OF THE INVENTION

It is desirable to provide an excellent wireless communication system, wireless communication apparatus and wireless communication method, which are capable of performing communication at a high transmission rate by a beamformed packet by allowing a terminal which operates as a beamformer to suitably set a transmission weight matrix on the basis of an estimation channel matrix fed back from a terminal which operates as a beamformee.

It is also desirable to provide an excellent wireless communication system, wireless communication apparatus and wireless communication method, which are capable of suitably performing beamforming by the explicit feedback without deteriorating beamforming characteristics or increasing a processing capability of channel estimation or a computing capability of a matrix for beamforming in the beamformee even when a beamformer and a beamformee are different from each other in the number of antennas or the number of supported streams.

According to an embodiment of the invention, there is provided a wireless communication system which performs data transmission using spatially multiplexed streams from a first terminal including N antennas to a second terminal including M antennas (N is an integer of 2 or more and M is an integer of 1 or more), the system including: notifying means for notifying the first terminal of a maximum dimension $N_{max}$ at the time of estimating a channel matrix of the second terminal ($N_{max}$ is an integer of N or less); training means for transmitting a sounding packet including training sequence for exciting a channel corresponding to the maximum dimension $N_{max}$ from the first terminal to the second terminal; in a case of N>M, channel matrix estimation means for dividing the training sequence received by the antennas of the second terminal into $N_{max}$ or less streams and estimating the channel matrix having M rows and $N_{max}$ or less columns; a beamforming information feedback unit which prepares beamforming information necessary for calculating a transmission weight matrix for beamforming in the first terminal on the basis of the channel matrix estimated in the second terminal and feeding back the beamforming information from the second terminal to the first terminal; transmission weight matrix setting means for setting the transmission weight matrix for beamforming at the time of transmitting data from the first terminal to the second terminal on the basis of the beamforming information fed back from the second terminal to the first terminal; and beamforming means for performing beamforming in transmission signals of the antennas of the first terminal using the transmission weight matrix for beamforming when a data packet is transmitted from the first terminal to the second terminal.

The term "system" described herein indicates a logical set of apparatuses (or function modules for realizing specific functions) and it is not specially considered whether the apparatuses or the function modules are included in a single casing (The same is true in the below description).

As a technology for realizing a high speed of wireless communication, there is an MIMO communication method which includes a plurality of antenna elements in a transmitter side and a receiver side and realizes spatially multiplexed streams. In particular, in a closed loop type MIMO communication system, a terminal of a data packet transmission side performs beamforming on the basis of feedback of information on an estimation channel matrix from a terminal of a reception side such that a plurality of spatial orthogonal multiplexed propagation channels which are logically independent are realized and the receiver side can extract a plurality of original signal sequence without crosstalk, thereby theoretically accomplishing maximum performance.

As a procedure of performing feedback of the channel matrix from the terminal of the reception side to the terminal of the transmission side, for example, two kinds of procedures, that is, "implicit feedback" and "explicit feedback", are defined in the EWC HT MAC specification. Among them, in the explicit feedback, the first terminal which operates as a beamformer performs the beamforming of a transmission packet to perform communication using the transmission weight matrix for beamforming based on the channel information fed back from the second terminal which operates as a beamformee. It is possible to reduce a processing burden necessary for performing the beamforming in the beamformer.

However, when the beamformer and the beamformee are different from each other in the number of antennas or the number of supported streams, there are several problems at the time of the beamforming. This is because the terminal having a smaller number of antennas needs to perform channel estimation, calculation of the transmission weight matrix and the multiplication of the transmission weigh matrix with the dimension number larger than or equal to the number which is considered at the time of designing.

In particular, in a case where the number N of antennas of the beamformer is larger than the number M of antennas of the beamformee and the STA-B can correspond to at most M streams, the STA-B cannot obtain the estimation channel matrix in spite that the sounding packet for exciting the spatial channel matrix of N dimensions is transmitted from the STA-A, because the STA-B can correspond to at most M×M estimation channel matrix.

Accordingly, in the wireless communication system according to the embodiment of the invention, when the beamforming is performed according to the explicit feedback, the maximum dimension $N_{max}$ at the time of estimating the channel matrix of the second terminal is notified to the first terminal and the first terminal transmits the sounding packet including the training sequence for exciting the channel corresponding to the maximum dimension $N_{max}$. Here, "corresponding to the maximum dimension $N_{max}$" does not indicate that the excited spatial dimension is limited to $N_{max}$". Generally, it indicates that the second terminal estimates the channel in a format that an estimation process of a dimension larger than M×$N_{max}$ is not performed. As an example, the below-described staggered sounding packet may be considered. In this case, the entire exciting channel dimension is N(>$N_{max}$), but the training sequence are divided into a part for exciting the channel of $N_{max}$ dimensions and a part for exciting the channel of N–$N_{max}$ dimensions such that the second terminal can perform channel estimation using only the part $N_{max}$ which can be processed. That is, even when the exciting channel space dimension is larger than $N_{max}$, the sounding packet which is considered such that the channel estimation is possible in the processing capability in consideration of the maximum dimension $N_{max}$ at the time of estimating the channel matrix of the second terminal corresponds to "corresponding to the maximum dimension $N_{max}$".

That is, since the first terminal suppresses the number of streams of the channel for exciting the sounding packet according to the processing capability of the second terminal for estimating the channel matrix, the second terminal surely receives the sounding packet in a range of its own maximum dimension number. In this case, it is possible to reduce the size of the channel matrix estimation circuit of the second terminal as the beamformee and to realize low cost or low power consumption of the apparatus.

The first terminal is designed to include the processing capability corresponding to the number of its own streams and includes the processing capability such as computation for requesting the transmission weight matrix for beamforming from the channel matrix of N×N dimensions or less or multiplication of the transmission vector and the transmission weight matrix for beamforming of N×N dimensions or less. Accordingly, when the CSI information, that is, M×$N_{max}$ channel matrix, is fed back from the second terminal, the first terminal can compute the transmission weight matrix for beamforming. Alternatively, even when the M×$N_{max}$ transmission weight matrix for beamforming computed from the channel matrix (in the compressed or uncompressed format) is fed back from the second terminal, the transmission weight matrix for beamforming can be multiplied with the transmission vector in the range of its own processing capability and thus no problem is caused.

On a protocol according to the EWC specification, in a predetermined management frame, a capability description field for describing a possible maximum spatial dimension when a beamformee of explicit feedback receives a packet including training sequence is defined. Accordingly, the notifying means can notify the first terminal of the maximum dimension $N_{max}$ at the time of estimating the channel matrix of the second terminal using the management frame for describing the capability description field. The management frame is, for example, a type of transmission frame of the beacon which is notified in a frame period, a measure pilot, an association response and a re-association response which respond to the request of association from the client terminal, a probe response which responds to the request of BBS information from the client terminal, or an association request and re-association request for requesting network association by the client terminal (or a communication station other than the access point) and a probe request for requesting BBS information to the access point. Accordingly, even when the second terminal operates as any one of an access point and a client terminal, the notifying means can perform notification.

The beamformer may include a signal for requesting the CSI information in the sounding packet including the training sequence for exciting the channel. In particular, the CSI information may be requested by specifying the feedback method received from the beamformee in the explicit feedback, in the CSI/Steering field provided in the HT control field of the MAC frame. Accordingly, the training means may include a request signal for requesting feedback of the channel information from the first terminal to the second terminal in the sounding packet for exciting the channel.

In the EWC specification, a zero length frame (ZLF) (also called a null data packet (NDP) and hereinafter referred to as "ZLF") dedicated to the sounding packet, which includes only a PHY header part including the training sequence for exciting the channel and does not include an MAC frame, is defined. Since the ZLF does not have the MAC header, the CSI information cannot be requested by the HT control field. In such a case, the training means does not include the signal for requesting the CSI information in the sounding packet and requests the CSI information in the HT control field of a general packet transmitted prior thereto.

It is possible to reduce an operation amount necessary for estimating the channel matrix by transmitting the sounding packet in a staggered format for temporally dividing a training signal part used for a space division process of a data part and a training signal for exciting a channel of a spatial dimension larger than or equal to the number of streams of data from the first terminal to the second terminal.

In particular, the first terminal excites the channel of $N_{max}$ spatial dimensions in a training signal part used for the space division process of the data part and allows a training signal for exciting the channel of N–$N_{max}$ remaining spatial dimensions to be not related to the space division of the signal, with respect to the sounding packet.

In this case, when the second terminal receives the sounding packet, the channel of $N_{max}$ spatial dimensions is excited to estimate M×$N_{max}$ channel matrix in the training signal part used for the space division process of the data part, but the training signal for exciting the channel of N–$N_{max}$ remaining spatial dimensions does not need to be processed. Although a part attached to the end of the training is not processed in order to excite remaining N–$N_{max}$ channels, no problem is caused in channel estimation or data symbol demodulation.

If the direct mapping for mapping one antenna branch to each transmission stream is performed when the first terminal transmits the sounding packet with the stream suppressed to the maximum dimension $N_{max}$ or less which is allowed by the second terminal, the beamforming effect deteriorates. Since the first terminal includes N antennas but does not use all the antennas and the beamforming must be originally performed with respect to the M×N channel matrix but the dimension number is suppressed to M×$N_{max}$, a beam gain is reduced and thus a transmission diversity gain is also reduced. The transmission power of $N_{max}$ antenna branches used for transmission increases and distortion of the signal increases in a transmission end.

When the dimension number of the sounding packet is suppressed, for example, the first terminal may perform conversion for mapping $N_{max}$ spatial streams to all N transmission antenna branches by a spatial expansion and compensate the deterioration of the characteristics by the transmission diversity. For example, it is possible to perform the mapping to the transmission signals to all N transmission antenna branches by multiplying the sounding packet of $N_{max}$ dimensions specified from the second terminal by an N×$N_{max}$ mapping matrix.

Correlation between the transmission antenna branches may not be sufficiently reduced by the multiplication of the mapping matrix. Accordingly, the first terminal may give different cyclic shift delay amounts to the transmission antenna branches after the multiplication of the mapping matrix. The undesired beamforming may be performed when identical or similar signals are transmitted through different spatial streams. However, it is possible to reduce the correlation between the transmission antenna branches to reduce the undesired directional characteristics. The cyclic shift delay described herein is an operation for cutting out a part of the time axis waveform of the OFDM symbol and fitting the part to the opposite end (corresponding to phase rotation on a frequency axis) (see FIG. 10), which is different from the simple delay of the transmission timing between the transmission antenna branches.

When the first terminal performs the conversion for mapping the $N_{max}$ spatial streams to all the N transmission antenna branches, other mapping to the transmission antenna branches may be performed in the subcarrier unit, as shown in FIG. 11. In this case, since the correlation between the transmission antenna branches is high in the subcarrier unit, the cyclic shift delay may be used together, as described above.

According to the embodiment of the invention, it is possible to an excellent wireless communication system, wireless communication apparatus and wireless communication method, which are capable of performing communication at a high transmission rate by a beamformed packet by allowing a terminal which operates a beamformer to suitably set a transmission weight matrix on the basis of an estimation channel matrix fed back from a terminal which operates as a beamformee.

According to the embodiment of the invention, it is possible to provide an excellent wireless communication system, wireless communication apparatus and wireless communication method, which are capable of suitably performing beamforming by the explicit feedback without deteriorating beamforming characteristics or increasing a processing capability of channel estimation or a computing capability of a matrix for beamforming in the beamformee even when a beamformer and a beamformee are different from each other in the number of antennas or the number of supported streams.

According to the wireless communication system of the embodiment of the invention, it is possible to reduce complexity of the circuit or power consumption of a communication terminal which is the beamformee by suppressing the dimension number of the sounding packet transmitted from the beamformer according to the processing capability of the beamformee when the explicit feedback for feeding back CSI information or transmission weight matrix for beamforming is performed, even if the number of antennas of the beamformer is larger than the number of antennas of the beamformee.

According to the embodiment of the invention, it is possible to perform the beamforming while maintaining the transmission diversity effect to some extent by mapping transmission streams to all transmission antenna branches when suppressing the dimension number of the sounding packet transmitted from the beamformer.

The other objects, features and advantages of the invention will become apparent and more readily appreciated from the following description of the embodiments, taken in conjunction with the accompanying drawings.

BRIEF DESCRIPTION OF THE DRAWINGS

FIG. 1A is a schematic diagram of an operation procedure (in a case where CSI information is fed back) of explicit feedback according to an embodiment of the invention.

FIG. 1B is a schematic diagram of an operation procedure (in a case where a transmission weight matrix for beamforming is fed back) of the explicit feedback according to an embodiment of the invention.

FIG. 16 is a view showing a scheme of a HT control field of an MAC frame defined in the EWC specification.

FIG. 17 is a view showing a scheme of a CSI/steering field included in the HT control field.

FIG. 18 is a view showing a state where the explicit feedback is performed with a CSI format.

FIG. 19 is a view showing a state where the explicit feedback is performed with the CSI format.

FIG. 20 is a view showing a format of a HT capability element.

FIG. 21 is a view showing the configuration of a Tx beamforming capability field included in the HT capability element.

DETAILED DESCRIPTION OF PREFERRED EMBODIMENTS

Figure 2:
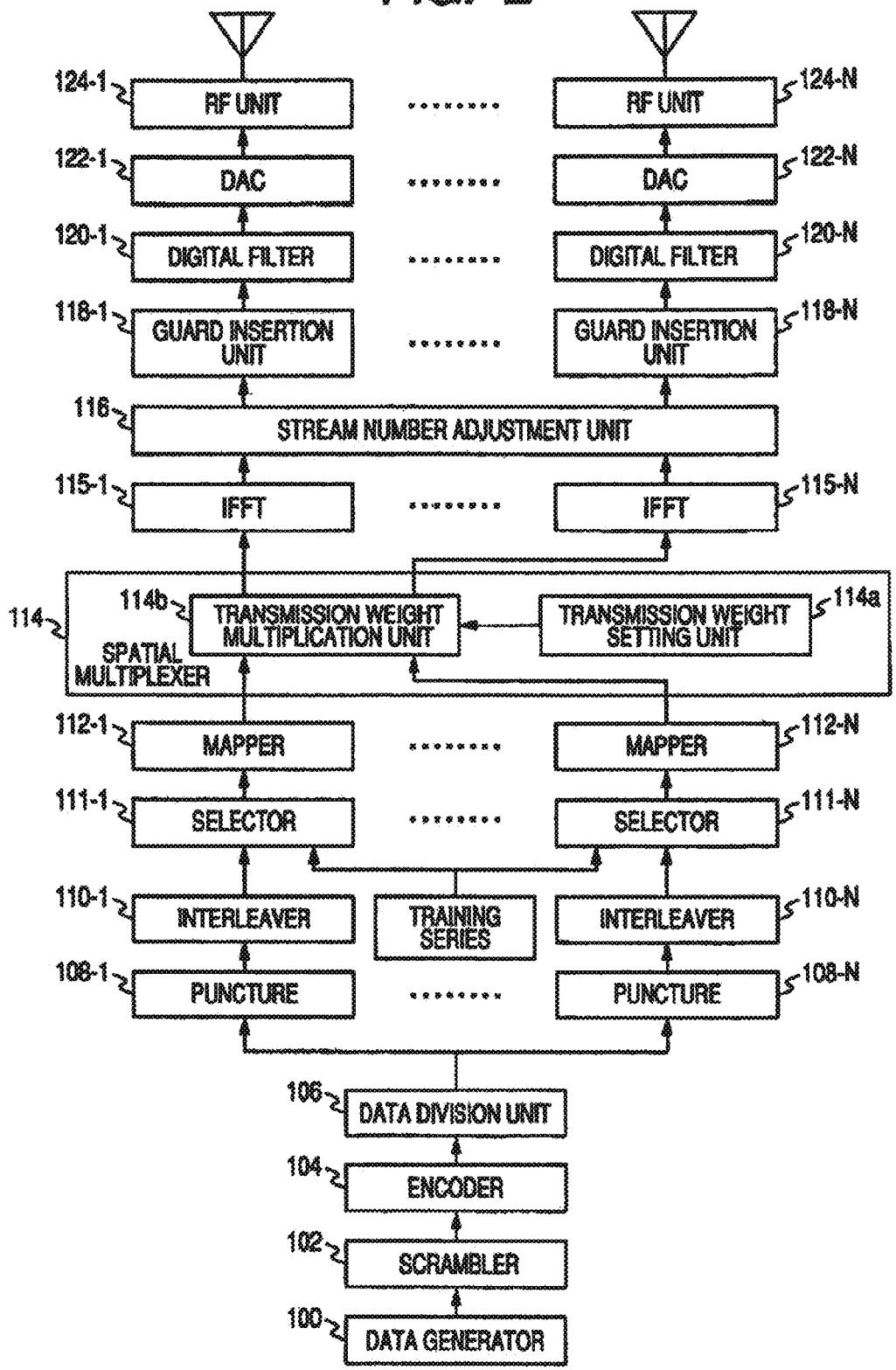
FIG. 2 is a view showing the configuration of a transmitter side of a wireless communication apparatus which can operate as a STA-A (or STA-B) in a wireless communication system shown in FIGS. 1A and 1B.

Hereinafter, embodiments of the invention will be described in detail with reference to the accompanying drawings.

A wireless communication system according to the embodiment of the invention performs closed loop type MIMO communication and more particularly, a terminal of a transmitter side performs beamforming in order of performing feedback for a channel matrix, for example, in order of the "explicit feedback" defined in the EWC HT MAC specification. In the explicit feedback, a beamformer beamforms a transmission packet using a transmission weight matrix for beamforming obtained on the basis of an estimation channel matrix fed back from a beamformee so as to perform communication.

However, a processing capability for performing channel estimation or a processing capability for computing a matrix for beamforming is given to a terminal in consideration of the number of its own antennas. Accordingly, if the number of antennas of the beamformer is large, the beamformee may not divide the packet into spatial stream trainings to estimate the channel matrix or obtain the matrix for beamforming from the estimation channel matrix because the spatial dimension number is large even when the beamformer transmits a sounding packet to excite the channel.

Accordingly, in the wireless communication system according to the embodiment of the invention, when the beamforming is performed by the explicit feedback, a maximum dimension $N_{max}$ of the beamformee at the time of the channel matrix estimation is notified to the beamformer, and the sounding packet transmitted from the beamformer is excited such that the spatial dimension number of the channel to be estimated by the beamformee is suppressed to the maximum $N_{max}$ or less. Accordingly, since the beamformee surely receives the sound packet in a range of its own capability, the size of a channel matrix estimation circuit can be reduced and low cost or low power consumption of an apparatus can be realized.

FIG. 1A is a schematic diagram of an operation procedure of the explicit feedback according to the embodiment of the invention. Here, the number of antennas of a STA-A as the beamformer is 3 and the number of antennas of a STA-B as the beamformee or the maximum spatial dimension number at the time of computing the transmission weight matrix for beamforming is 2. The procedure is performed on the basis of the EWC MAC specification.

The STA-B previously notifies the STA-A that the maximum dimension number at the time of estimating the channel matrix is 2. The STA-A excites the channel to a format in which the spatial dimension of the channel to be estimated by the STA-B is 2×2 and transmits the sounding packet to the STA-B using two streams.

Since the STA-B receives the sounding packet in the range of its own capability, a 2×2 forward estimation channel matrix can be easily generated. CSI information composed of coefficients of the estimation channel matrix is prepared and fed back to the STA-A using two streams.

Since the STA-A receives the fed-back CSI information using three antennas, the information is received in a 3×2 spatial dimension, but is property processed because the STA-A is designed to include a processing capability corresponding to the number of its own streams. When the 2×2 channel matrix is extracted from the CSI information, computation such as singular value decomposition is performed such that a 2×2 transmission weight matrix V for beamforming can be easily obtained.

The STA-A multiplies a two-dimensional transmission vector by the 2×2 transmission weight matrix V for beamforming to perform beamforming and transmits two transmission streams in order to transmit a data packet. Alternatively, two transmission streams are mapped to three antennas by space expansion to perform the beamforming in a state where transmission diversity effect is maintained to some extent.

Thereafter, a request of the sounding packet and the channel estimation and the computation of the transmission weight matrix for beamforming due to the reception of the sounding packet are repeatedly performed whenever the STA-A performs the beamforming.

Since the STA-B surely receives the sounding packet in the range of its own capability, the size of the channel matrix estimation circuit can be reduced and low cost or low power consumption of the apparatus can be realized.

FIG. 1B is a schematic diagram of an operation procedure of the explicit feedback when the transmission weight matrix V for beamforming is fed back, instead of the CSI information. Here, the number of antennas of the STA-A is 3 and the number of antennas of the STA-B and the maximum spatial dimension number at the time of computing the transmission weight matrix for beamforming are 2.

The STA-B previously informs the STA-A that the maximum dimension number at the time of estimating the channel matrix is 2. The STA-A excites the channel to a format in which the spatial dimension of the channel to be estimated by the STA-B is 2×2 and transmits the sounding packet to the STA-B using two streams.

Since the STA-B receives the sounding packet in the range of its own capability, a 2×2 forward estimation channel matrix can be easily generated. The 2×2 transmission weight matrix V for beamforming is obtained by performing the computation such as the singular value decomposition from the 2×2 channel matrix and fed back to the STA-A using two streams.

Since the STA-A receives the fed-back information using three antennas, the information is received in a 3×2 spatial dimension, but is property processed to extract the transmission weight matrix V for beamforming because the STA-A is designed to include a processing capability corresponding to the number of its own streams.

Since the spatial dimension number 2×2 of the transmission weight matrix V for beamforming is in the range of the capability of the STA-A having three antennas, the 2×2 transmission weight matrix V for beamforming can be easily multiplied with the two-dimensional transmission vector, the beamforming is performed and two transmission streams are transmitted in order to transmit a data packet. Alternatively, two transmission streams are mapped to three antennas by space expansion to perform the beamforming in a state where transmission diversity effect is maintained to some extent.

Thereafter, the request of the sounding packet, and the channel estimation and the computation of the transmission weight matrix for beamforming due to the reception of the sounding packet are repeatedly performed whenever the STA-A performs the beamforming.

Since the STA-B surely receives the sounding packet in the range of its own capability, the size of the channel matrix estimation circuit can be reduced and low cost or low power consumption of the apparatus can be realized.

In the operation procedure shown in FIGS. 1A and 1B, the STA-B needs to notify the STA-A of the maximum dimension number 2 at the time of estimating the channel matrix. In the EWC specification, when the explicit feedback is applied, a scheme of informing of information on the channel estimation maximum dimension as one of the capability of the beamformee is determined and can be used.

In the EWC specification, it is defined that the HT terminal corresponding to the high-speed transmission transmits a HT capability element to declare that it is the HT terminal. The HT terminal may include a HT capability field in a predetermined management frame and declare any element of a HT function by the HT capability element.

In the TxBF (transmit beamforming) capability field (see FIG. 21) included in the format of the HT capability element, any HT function of the beamforming (see FIG. 20) is specified.

The Tx beamforming capability field has 32 bits, but, among them, $19^{th}$ to $20^{th}$ bits are allocated to the CSI number of beamformer antennae, $21^{st}$ to $22^{nd}$ bits are allocated to the uncompressed steering matrix of beamformer antennae, and $23^{rd}$ to $24^{th}$ bits are allocated to the compressed steering matrix of beamformer antennae. In these fields, the spatial dimension number of the sounding packet which can be received from the beamformer when the beamformee performs the explicit feedback with each format is described.

The HT capability element may be included in the predetermined management frame. For example, when the STA-B operates as the access point, the HT capability field may be included in a type of transmission frame of the beacon which is notified in each frame period, a measure pilot, an association response and a re-association response which respond to the request of association from the client terminal, or a probe response which responds to the request of BBS information from the client terminal such that the dimension number of the CSI information is notified to the STA-A which participates in the network operated by the STA-B. When the STA-B operates as the client terminal (or a communication station other than the access point), the HT capability field may be included in a type of transmission frame of an association request and re-association request for requesting network association to the STA-A which operates as the access point and a probe request for requesting BBS information to the access point. Accordingly, when the STA-B operates as the access point or the client terminal, the maximum dimension which is allowed in the CSI information may be notified to the STA-B, by transmitting the HT capability element.

In the beamforming procedure shown in FIGS. 1A and 1B, the STA-A as the beamformer includes a signal for requesting the CSI information in the sounding packet including training sequence for exciting the channel. In particular, in a CSI/Steering field provided in the HT control field (see FIG. 16) of the MAC frame, a feedback method received from the beamformee can be specified in the explicit feedback (see FIG. 17).

In the EWC specification, a zero length frame (ZLF) dedicated to the sounding packet, which includes only a PHY header part including the training sequence for exciting the channel and does not include an MAC frame, is defined. Since the ZLF does not have the MAC header, the CSI information cannot be requested by the HT control field. In such a case, the signal for requesting the CSI information is not included in the sounding packet and the CSI information is requested in the HT control field of a general packet transmitted prior thereto.

Figure 4A:
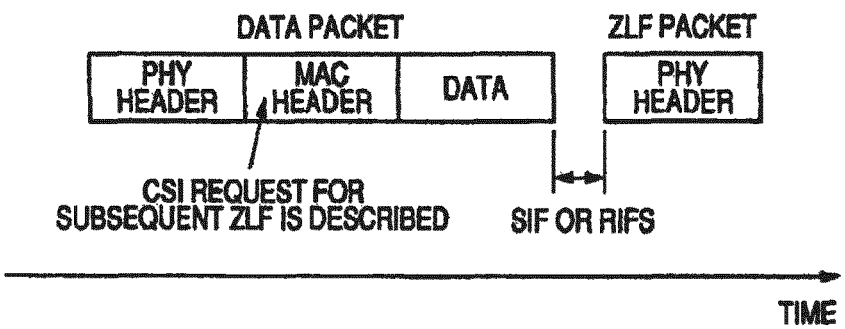
FIG. 4A is a view showing an example of a transmission operation of a ZLF packet.

FIG. 4A shows an example of a transmission operation of the ZLF packet. As shown, the ZLF packet is transmitted when a short interframe space (SIFS) or a reduced inter frame space (RIFS) elapses after a general data packet is transmitted. In the HT control field in the MAC header included in the general data packet, the CSI request for the subsequent ZLF packet is performed by specifying the CSI/Steering field.

Figure 4B:
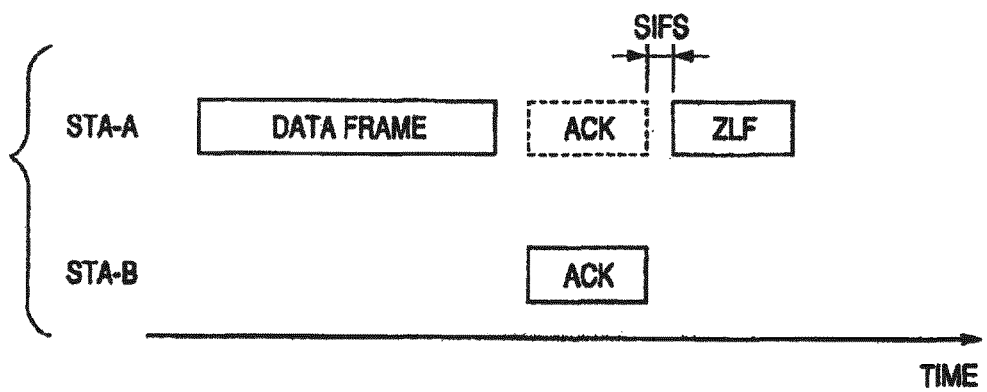
FIG. 4B is a view showing an example of the transmission operation of the ZLF packet.

In an example shown in FIG. 4B, the STA-A requests of the feedback of the CSI information in the data frame for requesting an immediate response, but declares that the ZLF is continuously transmitted therein. When the STA-B returns an ACK according to the immediate response, the STA-A transmits the ZLF when the SIFS elapses after the ACK is received.

Up to now, the STA-A which suppresses the spatial dimension number of the channel excited according to the processing capability of the STA-B and transmits the sounding packet was described. As a packet transmission method for suppressing the spatial dimension of the channel, there is a staggered format.

The staggered packet has a training signal part used for a space division process of a data part and a packet structure for temporally dividing a training signal for exciting a channel of the spatial dimension larger than or equal to the number of streams of data and the receiver side reduces an operation amount necessary for estimating the channel matrix.

The STA-A excites the channel of $N_{max}$ spatial dimensions corresponding to the processing capability of the STA-B in a training signal part used for the space division process of the data part and allows a training signal for exciting the channel of $N-N_{max}$ remaining spatial dimensions to be not related to the space division of the signal, with respect to the sounding packet. In this case, when the STA-B receives the sounding packet, the channel of N spatial dimensions is excited to estimate $M \times N_{max}$ channel matrix in the training signal part used for the space division process of the data part, but the training signal for exciting the channel of $N-N_{max}$ remaining spatial dimensions does not need to be processed. Although a part attached to the end of the training is not processed in order to excite remaining $N-N_{max}$ channels, no problem is caused in channel estimation or data symbol demodulation.

Now, the procedure of the explicit feedback when the sounding packet of the staggered format is used will be described. For simplification of the description, although a case where each stream is directly mapped to each antenna branch will be described, the invention is not limited to the case.

Figure 5:
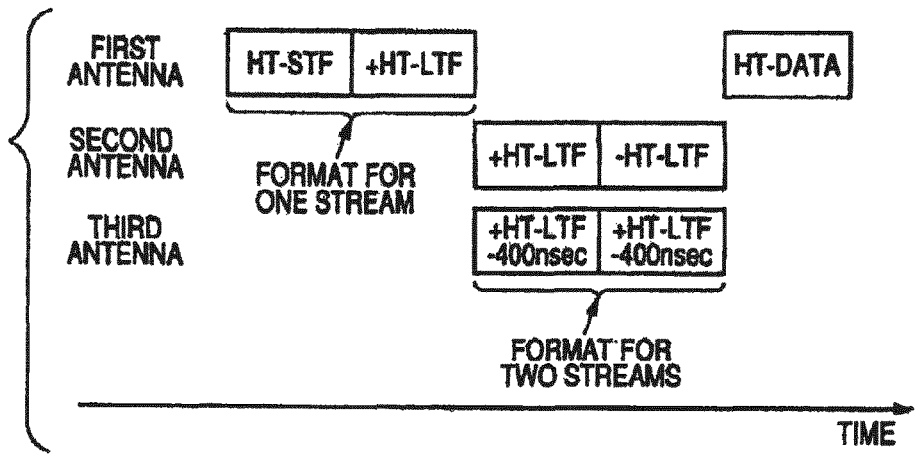
FIG. 5 is a view showing a format example of a staggered sounding packet.

FIG. 5 shows a format example of the staggered sounding packet when the beamformee having three antennas transmits data of one stream.

A HT-STF (short training field) is a training symbol for improving automatic gain control (AGC) in the MIMO system, which includes QPSK-modulated OFDM signals of 52 tones. A HT-LTF (long training field) is a training symbol for performing the channel estimation for each input signal which is spatially modulated in the receiver side, which includes BPSK-modulated OFDM signals of 56 tones. These are training signals defined in a HT mode of the EWC specification. A value of −400 nsec which is described in the HT-LTF simultaneously transmitted from a third antenna is a cyclic shift delay amount which is provided in order to avoid unintended beamforming when identical or similar signals are transmitted through different spatial streams, which shifts and connects a time axis wavelength of an OFDM symbol sent from the third antenna by −400 nanoseconds.

In the example shown in FIG. 5, one stream is transmitted with a format having a data stream, but, with a temporal separation therefrom, training signals for exciting the channel of the remaining spatial dimension are transmitted from the other two antennas which are not used for the space division process of the data part.

Figure 6:
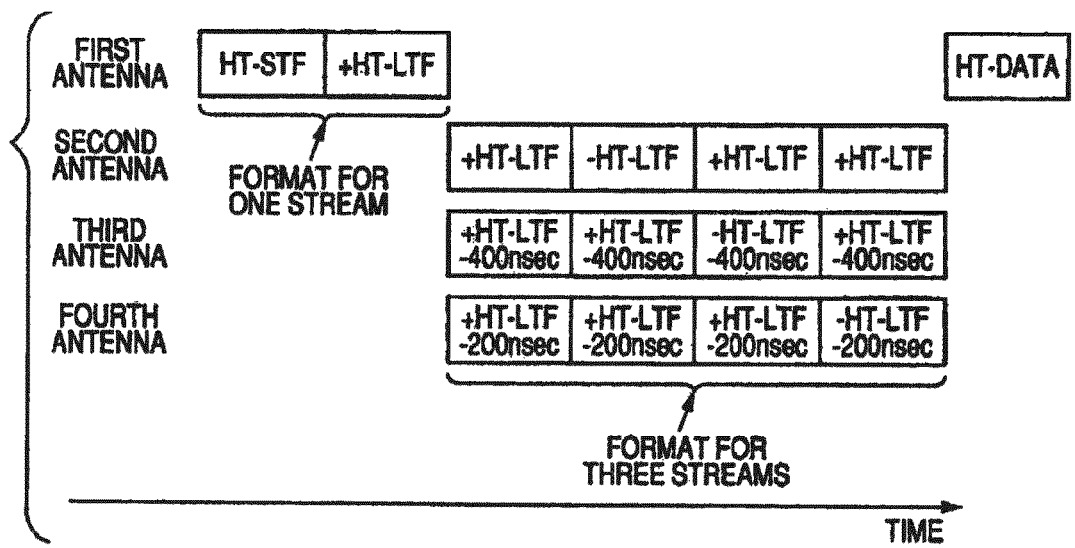
FIG. 6 is a view showing a format example of the staggered sounding packet.

FIG. 6 shows a format example of the staggered sounding packet when data of one stream is transmitted from the beamformee having four antennas. In the shown example, one stream is transmitted with the format having the data stream and, with a temporal separation therefrom, the training signals for exciting the channel of the remaining spatial dimension are transmitted from the other three antennas which are not used for the space division process of the data part. In the current EWC specification, it is defined that four HT-LTFs are used in the training of three streams.

Figure 7:
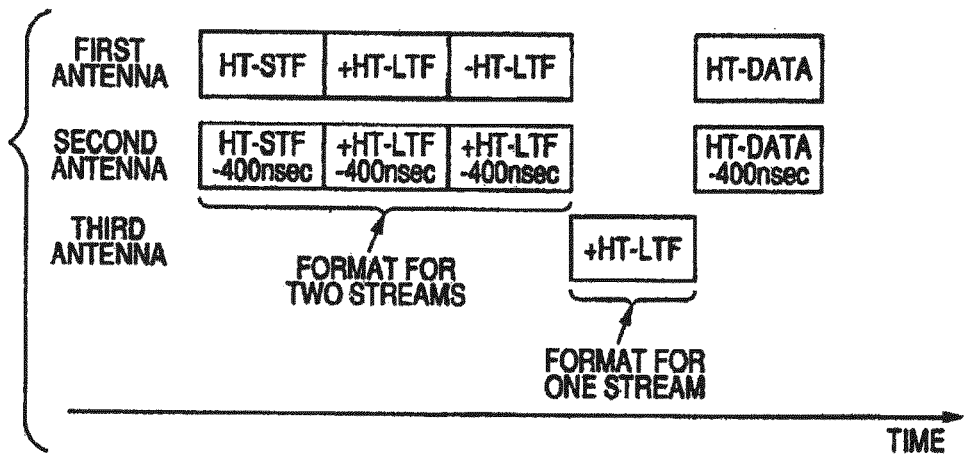
FIG. 7 is a view showing a format example of the staggered sounding packet.

FIG. 7 shows a format example of the staggered sounding packet when data of two streams is transmitted from the beamformee having three antennas. In the shown example, two streams are transmitted with the format having the data stream and, with a temporal separation therefrom, the training signals for exciting the channel of the remaining spatial dimension are transmitted from the other one antenna which is not used for the space division process of the data part.

Figure 8:
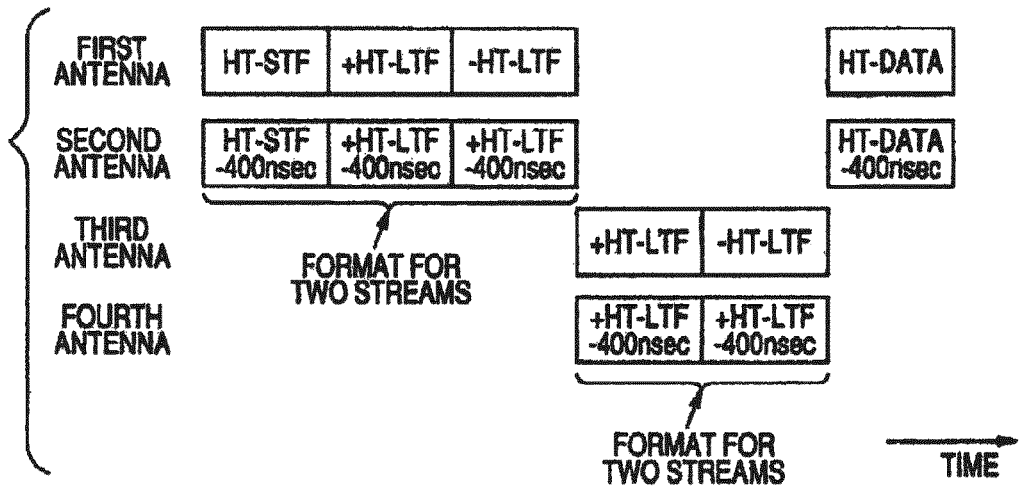
FIG. 8 is a view showing a format example of the staggered sounding packet.

FIG. 8 shows a format example of the staggered sounding packet when data of two streams is transmitted from the beamformee having four antennas. In the shown example, two streams are transmitted with the format having the data stream and, with a temporal separation therefrom, the training signals for exciting the channel of the remaining spatial dimension are transmitted from the other two antennas which are not used for the space division process of the data part.

Figure 9:
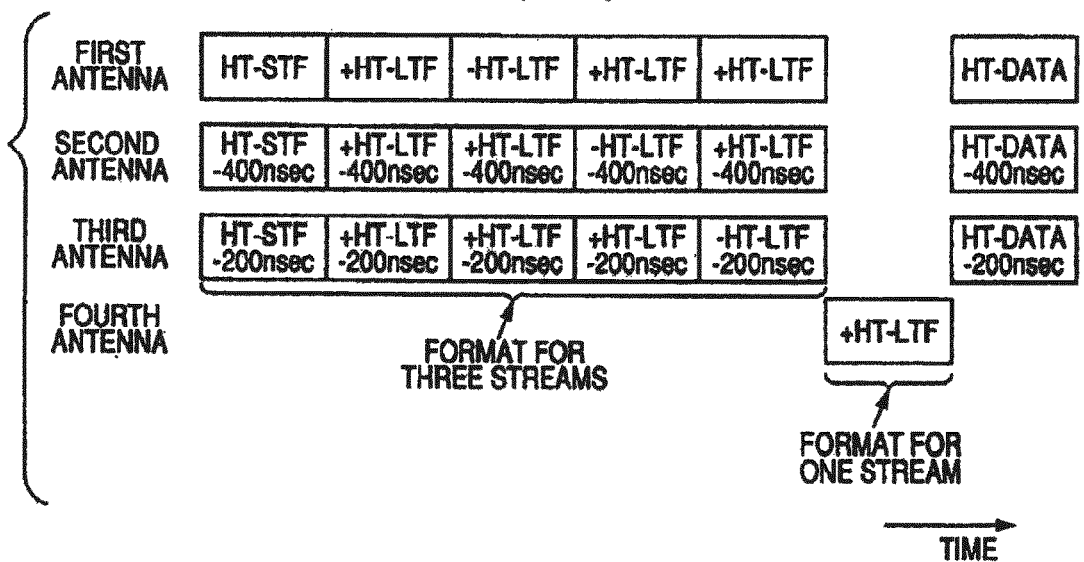
FIG. 9 is a view showing a format example of the staggered sounding packet.

FIG. 9 shows a format example of the staggered sounding packet when data of three streams is transmitted from the beamformee having four antennas. In the shown example, three streams are transmitted with the format having the data stream and, with a temporal separation therefrom, the training signals for exciting the channel of the remaining spatial dimension are transmitted from the other one antenna which is not used for the space division process of the data part. In the current EWC specification, it is defined that four HT-LTFs are used in the training of three streams.

As can be seen from FIGS. 5 to 9, in a wireless communication apparatus in which the number of antennas is two and the maximum number of estimatable streams is two, the reception of the data part (payload) of the packet and the estimation of a necessary channel matrix are in the processing capability range which is considered upon designing, when the staggered sounding packet has the structure shown in FIG. 5, 7 or 8. FIG. 6 shows the staggered sounding packet of one stream, which is not suitably applied to the invention.

In a wireless communication apparatus in which the number of antennas is three and the maximum number of estimatable streams is three, the reception of the staggered sounding packet shown in FIGS. 5 to 9 and the estimation of a necessary channel matrix are in the processing capability range which is considered upon designing. In a wireless communication apparatus in which the maximum number of streams is three, the specification in which four HT-LTFs are received and the channel estimation of three streams is performed therefrom is originally requested and no problem is caused in the structure of the apparatus.

As can be seen from FIGS. 5 to 9, when the number N of antennas in a initiator of the sounding packet (that is, the terminal which operates the beamformer in the explicit feedback) is larger than the number M of antennas in a receiver of the sounding packet (that is, the terminal which operates as the beamformee in the explicit feedback), the beamformee can selectively estimate only necessary M streams without performing the channel estimation of N streams (that is, without preparing an M×N channel matrix), by suitably using the staggered format.

If the beamformer includes four antennas and the beamformee includes two antennas, a circuit burden of the beamformer may not be reduced although the staggered sounding packet of the frame format shown in FIG. 6 is used. No problem is caused in the channel estimation from training (HT-LTF) of a first stream, but, in order to estimate the channel with respect to one stream, four HT-LTFs of the other three streams which are not used for the space division process of the data part transmitted with a temporal separation therefrom needs to be computed. Thus, the size of the circuit of the beamformee which can support at most two streams increases.

When the beamformer includes three antennas and the beamformee includes two antennas, the staggered sounding packet of the frame format shown in FIG. 5 or 7 is used.

When the sounding packet shown in FIG. 7 is transmitted from the beamformer, the beamformee can estimate the channel of two spatial dimensions necessary for the beamforming using the training signal part in a reception stream of the first to second antennas used for the space division of the data part. Since the reception streams of the third to fourth antennas which are not used for the space division of the data part transmitted with temporal separation do not need to be processed, the problem that the size of the circuit increases in the beamformee which can support at most two streams is not caused. No problem is caused in the channel estimation or the data symbol demodulation although the part attached to the end of the training is not processed in order to excite the third to fourth channels.

When the sounding packet shown in FIG. 5 is transmitted from the beamformer, the beamformee first estimates the channel using the training signal part in a reception stream of the first antennas used for the space division of the data part. However, two HT-LTF in each of the other two streams, which are not used for the space division of the data part transmitted with the temporal separation, needs to be processed, in order to estimate the channel with respect to one stream. The channel estimation of a 2×2 matrix may be performed from two HT-LTFs and the channel estimation of the other one stream may be performed. However, in this case, since the channel estimation result of a first stream needs to be buffered in another place, the size of the circuit slightly increases compared with the case shown in FIG. 7 which the buffer is not needed.

As another example, when the beamformer includes four antennas and the beamformee includes three antennas, the staggered sounding packet of the frame format shown in FIG. 6, 8 or 9 is used.

When the sounding packet of the frame format shown in FIGS. 6 and 8 is used, as described above, the channel estimation is performed without a problem, but there is a problem that the channel estimation result of first one or two stream needs to be buffered in another place. When the sounding packet of the frame format shown in FIG. 9 is used, the beamformee can estimate the channel of two spatial dimensions necessary for the beamforming using the training signal part in a reception stream of the first to third antennas used for the space division of the data part. Since the reception stream of the fourth antenna which is not used for the space division of the data part transmitted with the temporal separation does not need to be processed, the problem that the size of the circuit increases in the beamformee which can support at most three streams is not caused. No problem is caused in the channel estimation or the data symbol demodulation although the part attached to the end of the training is not processed in order to excite the fourth channel.

However, if the direct mapping for mapping one antenna branch to each transmission stream is performed when the STA-A transmits the sounding packet with the stream suppressed to the maximum dimension $N_{max}$ or less which is allowed by the STA-B, the beamforming effect deteriorates. Since the STA-A includes N antennas but does not use all the antennas and the beamforming must be originally performed with respect to the M×N channel matrix but the dimension number is suppressed to M×$N_{max}$, a beam gain is reduced and thus a transmission diversity gain is also reduced. The transmission power of $N_{max}$ antenna branches used for transmission increases and distortion of the signal increases in a transmission end.

With respect to such a problem, when the dimension number of the sounding packet is suppressed, for example, the STA-A may perform conversion for mapping $N_{max}$ spatial streams to all N transmission antenna branches by a spatial expansion and compensate the deterioration of the characteristics by the transmission diversity. For example, it is possible to perform the mapping of to all N transmission antenna branches by multiplying the sounding packet of $N_{max}$ dimensions specified from the STA-B by an N×$N_{max}$ mapping matrix.

For example, when the number of antenna of the STA-A is N=3 and the number of antennas of the STA-B is M=2, the dimension number is suppressed to the two-dimensional transmission stream ($s_1$, $s_2$) in order to transmit the sounding packet from the STA-A, but the transmission signal can be, for example, mapped to three transmission antennas by a mapping matrix E described below.

$$E = \begin{pmatrix} a & b \\ c & d \\ e & f \end{pmatrix} \quad (5)$$

That is, in the STA-A, a three-dimensional transmission vector is obtained by the two-dimensional transmission stream ($s_1$, $s_2$) by the 3×2 mapping matrix E. The STA-B receives the two-dimensional stream ($r_1$, $r_2$) by propagating the channel composed of 2×3 dimension shown Equation 2.

$$\begin{pmatrix} r_1 \\ r_2 \end{pmatrix} = \begin{pmatrix} h_{11} & h_{12} & h_{13} \\ h_{21} & h_{22} & h_{23} \end{pmatrix} \begin{pmatrix} a & b \\ c & d \\ e & f \end{pmatrix} \begin{pmatrix} s_1 \\ s_2 \end{pmatrix} \quad (6)$$

When the stream conversion is performed at the time of transmitting the sounding packet, the same mapping matrix E needs to be multiplied even when the beamforming is performed to transmit the data stream.

When the transmission streams are mapped to the transmission branches using the mapping matrix, there is a typical problem that undesired directional characteristics occur due to strong correlation between the signals when the signals are transmitted from the antennas. In order to avoid this problem, it is preferable that an orthogonal matrix is used such that the correlation between the antenna transmission signals is reduced, if possible.

For example, when two streams are mapped to four transmission antenna branches, the following mapping matrix is multiplied.

$$\begin{pmatrix} 1/2 & 1/2 \\ 1/2 & -1/2 \\ 1/2 & -1/2 \\ 1/2 & 1/2 \end{pmatrix} \quad (7)$$

As a non-orthogonal example, when two streams are mapped to three transmission antenna branches, the following mapping matrix is multiplied.

$$\begin{pmatrix} 1/\sqrt{3} & 1/\sqrt{3} \\ 1/\sqrt{3} & -1/\sqrt{3} \\ 1/\sqrt{3} & 1/\sqrt{3} \end{pmatrix} \quad (8)$$

The correlation between the transmission antenna branches may not be sufficiently reduced by only the multiplication of the mapping matrix. In the STA-A, different cyclic shift delay amounts may be given to the transmission antenna branches after the multiplication of the mapping matrix. When identical or similar signals are transmitted through different spatial streams, an unintended beam may be formed, but the correlation between the transmission antenna branches can be reduced by giving the different cyclic shift delay amounts, thereby reducing undesired directional characteristics.

For example, when a valid symbol length of an OFDM symbol is about 3.2 microseconds and a guard interval is about 800 microseconds, the cyclic shift delay amounts, that is, 0 nanoseconds, 50 nanoseconds, 100 nanoseconds and 150 nanoseconds, are given to four transmission antenna branches such that the correlation between the transmission signals from the antennas can be reduced to reduce occurrence of the directional characteristics. In this case, the cyclic shift delay amounts may be described as described below.

$$\begin{pmatrix} 1 & 0 & 0 & 0 \\ 0 & \exp(-j2\pi k \Delta_F 50 nsec) & 0 & 0 \\ 0 & 0 & \exp(-j2\pi k \Delta_F 100 nsec) & 0 \\ 0 & 0 & 0 & \exp(-j2\pi k \Delta_F 150 nsec) \end{pmatrix} \quad (9)$$

In the above equation, $\Delta_F$ is a subcarrier interval and k is a serial number of the subcarrier. It is possible to simply realize mapping from the streams to the transmission antenna branches by multiplying the above-described mapping matrix E by such a matrix from the left (corresponding to the procedure of giving the cyclic shift delay after the multiplication of the mapping matrix), and it is possible to reduce the correlation between the transmission signals of the antennas to reduce the undesired directional characteristics. Such a conversion scheme is called "spatial expansion" defined in the EWC specification.

Figure 10:
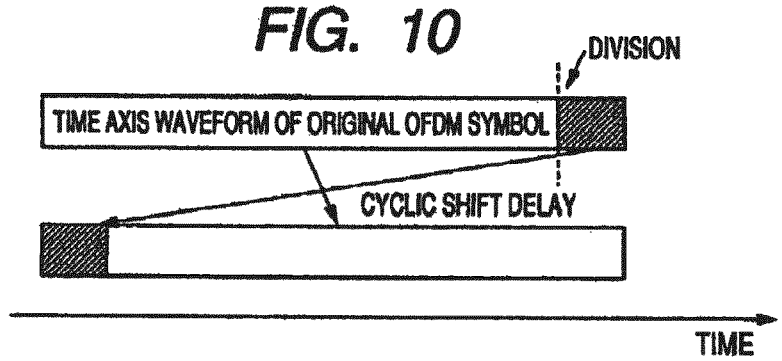
FIG. 10 is a view showing a state where a cyclic shift delay is applied to an OFDM symbol.

The cyclic shift delay described herein is an operation for cutting out a part of the time axis waveform of the OFDM symbol and fitting the part to the opposite end (corresponding to phase rotation on a frequency axis) (see FIG. 10), which is different from the simple delay of the transmission timing between the transmission antenna branches.

Figure 11:
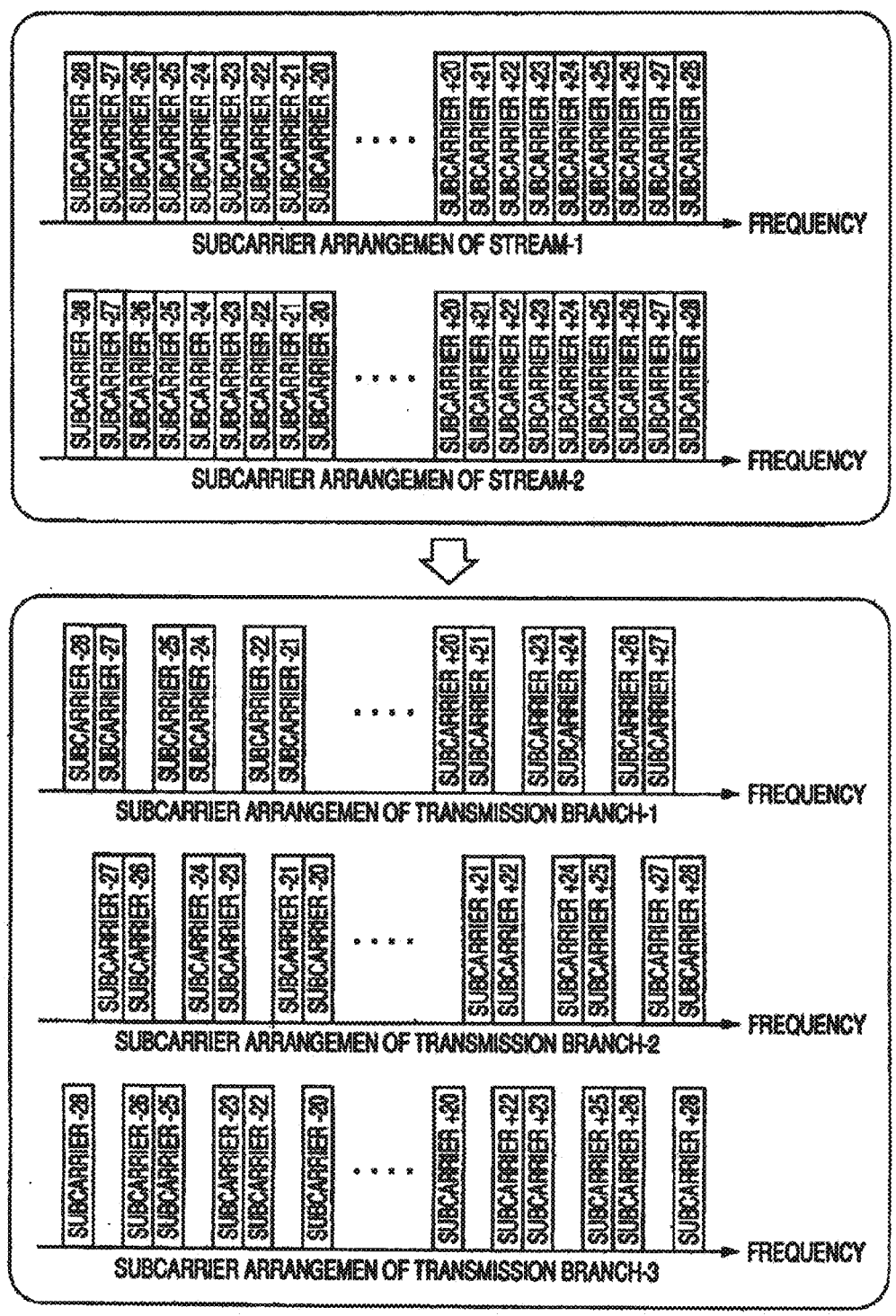
FIG. 11 is a view showing an example of performing mapping to transmission antennas in a subcarrier unit when the number of antennas of the STA-A is N=3 and the number of antennas of the STA-B is M=2.

In the STA-A, when the conversion for mapping the $N_{max}$ spatial streams to all the N transmission antenna branches, other mapping to the transmission antenna branches may be performed in the subcarrier unit. FIG. 11 is a view showing an example of performing mapping to transmission antennas in a subcarrier unit when the number of antennas of the STA-A is N=3 and the number of antennas of the STA-B is M=2. In this case, since the correlation between the transmission antenna branches is high in the subcarrier unit, the cyclic shift delay may be used together, as described above.

Figure 3:
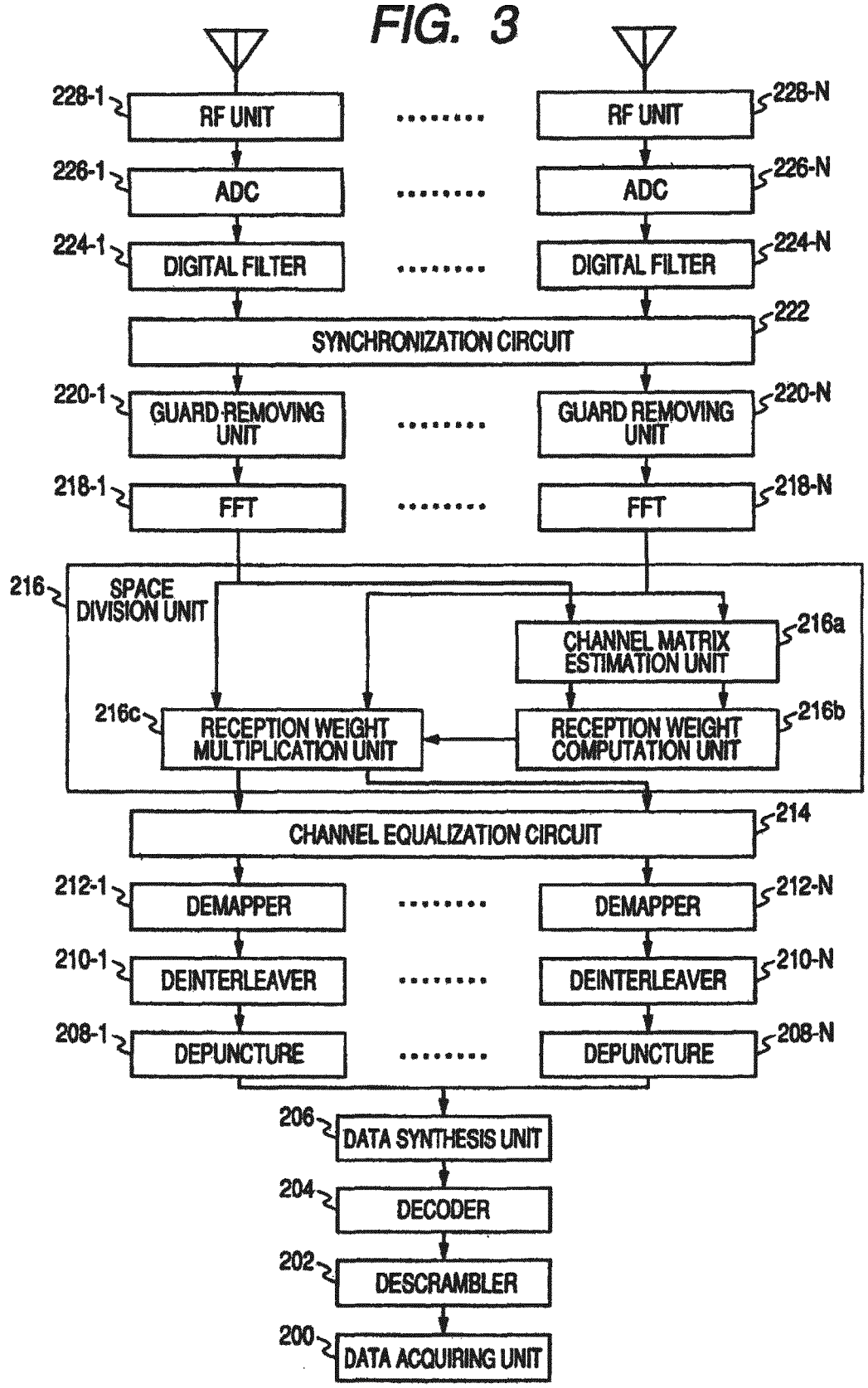
FIG. 3 is a view showing the configuration of a receiver side of the wireless communication apparatus which can operate as the STA-A (or STA-B) in the wireless communication system shown in FIGS. 1A and 1B.

FIGS. 2 and 3 show the configurations of the transmitter and the receiver of a wireless communication apparatus which can operate as the STA-A (or the STA-B) in the wireless communication system shown in FIG. 1, respectively. The number of antennas of the STA-A is N (the number of antennas of the STA-B is M) and N (or M) is at most four, for example, on the basis of the IEEE specification, but only two antennas are shown in the figures in order to avoid conflict of the figures.

Transmission data supplied to a data generator 100 is scrambled by a scrambler 102. Subsequently, error correction encoding is performed by an encoder 104. For example, in the EWC HT PHY specification, the scrambling and encoding methods are defined according to the definition of the IEEE 802.11a. The encoded signal is input to a data division unit 106 to be divided into the transmission streams.

In a case where the apparatus operates as the beamformer, the data generator 100 generates an MAC frame for describing the request of CSI information when performing the explicit feedback. In a case where the apparatus operates as the beamformee, a channel matrix estimation unit 216a of the receiver constructs a data frame including the CSI information on the basis of the estimated channel matrix, in response to the reception of the CSI information request. Alternatively, compressed or uncompressed data frame composed of transmission weigh matrix coefficients for beamforming calculated from the estimation channel matrix may be constructed.

In each transmission stream, the transmission signal is punctured by a puncture 108 according to a data rate applied to each stream, interleaved by an interleaver 110, mapped to an IQ signal space by a mapper 112, thereby becoming a conjugate baseband signal. In the EWC HT PHY specification, an interleaving scheme expands the definition of the IEEE 802.11a such that the same interleaving is not performed among a plurality of streams. As the mapping scheme, BPSK, QPSK, 16QAM or 64QAM is applied according to the IEEE 802.11a.

A selector 111 inserts the training sequence into the transmission signal of each interleaved spatial stream at an adequate timing and supplies it to the mapper 112. The training sequence include the HT-STF for improving the AGC in the MIMO system and the HT-LTF for performing the channel estimation for each input signal which is spatially modulated in the receiver side. For example, in the HT-LTF, the training sequence of each the transmission stream is inserted with the staggered format.

When the beamforming is performed with respect to the transmission signal, in a spatial multiplexer 114, a beamforming transmission weight matrix computation unit 114a calculates the transmission weight matrix V for beamforming from the channel matrix H using a computation method such as the singular value decomposition and a transmission weight matrix multiplication unit 114b multiplies the transmission vector having the transmission streams as the element by the transmission weight matrix V set by the transmission weight matrix setting unit 114a, thereby performing the beamforming. In order to transmit the sounding packet, the beamforming is not performed with respect to the transmission signal.

When the CSI information is fed back from the beamformee, the transmission weight matrix setting unit 114a calculates the transmission weight matrix V for beamforming on the basis of the CSI information and sets it to the transmission weight matrix multiplication unit 114b. When the compressed or uncompressed transmission weight matrix V for beamforming is fed back from the beamformee, it is set to the transmission weight matrix multiplication unit 114b without change.

An inverse fast Fourier transform unit (IFFT) 115 converts the subcarriers arranged in a frequency region into a time axis signal.

A stream number adjustment unit 116 adjusts the number of transmission streams to the maximum dimension $N_{max}$ or less which is received from the STA-B as the beamformee. When the direct mapping is performed, from the problem that the beamforming effect deteriorates, the transmission signals may be mapped to all the N transmission antenna branches by multiplication of the $N \times N_{max}$ mapping matrix and the deterioration of the characteristics may be compensated by the transmission diversity. Occurrence of the undesired directional characteristics may be reduced by giving the different cyclic shift delay amounts to the transmission branches. The stream number adjustment unit 116 may be realized by first multiplying the transmission vector by the mapping matrix and then multiplying it by a matrix for cyclic shift delay.

A guard insertion unit 118 adds a guard interval. A digital filter 120 performs band limitation, a DA converter (DAC) 122 converts it into an analog signal, and an RF unit 124 up-converts the analog signal to an adequate frequency band and transmits it to the channel through each transmission antenna.

Meanwhile, the data which reaches the receiver through the channel is analog-processed in an RF unit 228, converted into a digital signal by an AD converter (ADC) 226, and input to a digital filter 224, in each reception antenna branch.

Subsequently, a synchronization circuit 222 performs processes including packet detection, timing detection and frequency offset correction and a guard removing unit 220 removes the guard interval added to the top of the data transmission section. The fast Fourier transform unit (FFT) 218 transforms a time axis signal to a frequency axis signal.

A space division unit 216 performs a space division process of the spatially multiplexed reception signal. In particular, a channel matrix estimation unit 216a divides the spatial stream training included in the PHY header of the sounding packet and constructs an estimation channel matrix H from the training sequence.

An antenna reception weight matrix computation unit 216b calculates an antenna reception weight matrix W on the basis of the channel matrix H obtained by the channel matrix estimation unit 216a. In a case where the beamforming is performed with respect to the reception packet and the estimation channel matrix is subjected to the singular value decomposition (see Equation 3), the estimation channel matrix becomes equal to an UD and the antenna reception weight W is calculated therefrom. A method of calculating the antenna reception weight W is not limited to the singular value decomposition and a calculation method such as zero forcing or MMSE may be used. An antenna reception weight matrix multiplication unit 216c multiplies the reception vector having the reception streams as the element by the antenna reception weight matrix W to perform spatial decoding of the spatial multiplexed signal, thereby obtaining independent signal sequence for each stream.

In the explicit feedback, when the apparatus operates as the beamformee, the CSI information is constructed from the estimation channel matrix H obtained by the channel matrix estimation unit 216a and fed back from the transmitter side to the beamformer as the transmission data. When the transmission weight matrix V for beamforming is requested from the beamformer instead of the CSI information, the matrix V obtained by performing the singular value decomposition with respect to the estimation channel matrix H in the antenna reception weight matrix computation unit 216b is fed back.

A channel equalization circuit 214 performs remaining frequency offset correction and channel tracking with respect to the signal sequence of each stream. A demapper 212 demaps the reception signal on the IQ signal space, a deinterleaver 210 performs deinterleaving, and a depuncture 208 performs depuncturing at a predetermined data rate.

A data synthesis unit 206 synthesizes a plurality of reception streams to one stream. This data synthesis process performs an operation which is opposed to the data division performed in the transmitter side. A decoder 204 performs error correction decoding, a descrambler 202 performs descrambling, and a data acquiring unit 200 acquires the reception data.

When the apparatus operates as the beamformer, the CSI information acquired by the data acquiring unit 200 or the compressed/uncompressed transmission weight matrix V for beamforming is sent to the transmission weight matrix setting unit 114a of the transmitter side when the explicit feedback is performed.

When the wireless communication apparatus operates as the terminal of the data transmission side, that is, the beamformee, in the closed loop type MIMO communication, the beamformee notifies the beamformer of its own allowable maximum dimension $N_{max}$ and the spatial dimension number of the channel excited by the sounding packet transmitted from the beamformer is suppressed to the maximum dimension $N_{max}$ or less. Accordingly, since the beamformee surely receives the sounding packet in the range of its own capability, it is possible to reduce the size of the circuit of the channel matrix estimation unit 216a and to realize low cost or low power consumption of the apparatus.

Figure 12:
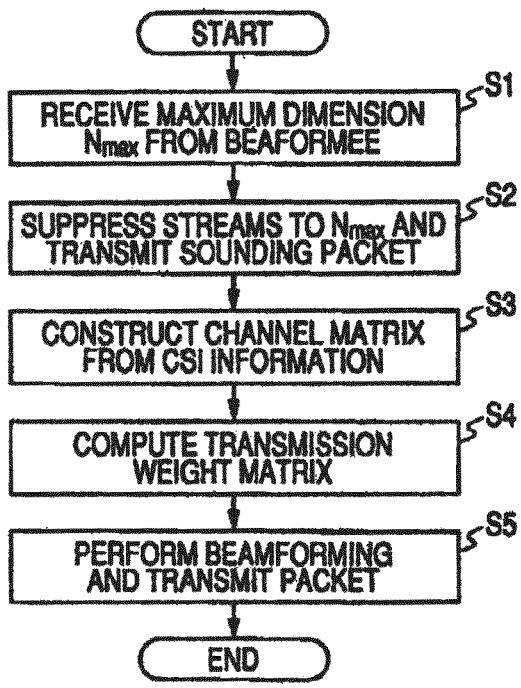
FIG. 12 is a flowchart illustrating a process when an apparatus operates as a beamformer on the basis of the explicit feedback procedure.

FIG. 12 is a flowchart illustrating a process when the wireless communication apparatus shown in FIGS. 2 and 3 operates as the initiator, that is, the beamformer, on the basis of the explicit feedback procedure. Here, it is assumed that the number of antennas of the beamformer is N and the number of antennas of the beamformee is M.

First, notification of the maximum spatial dimension number $N_{max}$ is received from the receiver which operates as the beamformee (step S1). Hereinafter, it is assumed that $N_{max}=M$. The notification is performed by receiving the management frame such as the message of network association or the signal including the HT capability field.

Subsequently, the spatial dimension number of the excited channel is suppressed to M×M and the sounding packet is transmitted to the STA-B using two streams to obtain the feedback of the transmission weight matrix V for beamforming or the CSI information (step S2).

Since the channel of M spatial dimensions is excited in the training signal part of the sounding packet such that the beamformee receives it using M antennas, it is possible to estimate an M×M channel matrix. According to the CSI information request, the CSI information is prepared on the basis of the estimation channel matrix and a packet in which the information is carried in a data part returns to the beamformer. Alternatively, when the feedback of the transmission weight matrix V for beamforming is requested, the estimation channel matrix is subjected to the singular value decomposition and a packet in which the coefficient data of the transmission weight matrix V for beamforming is included in the compressed or uncompressed format returns to the beamformer.

When the CSI information is received, the beamformer constructs the channel matrix (step S3) and obtains the transmission weight matrix for beamforming at the time of forward data transmission (step S4). Alternatively, the transmission weight matrix V for beamforming may be received in the step S3 and the step S4 may be skipped.

The beamforming is performed using the transmission weight matrix for beamforming in the transmission vector having the transmission signal from the antennas as the element and the data packet is transmitted to the receiver (step S5). It is possible to make an ideal spatial orthogonal channel by applying the transmission antenna weight on the basis of the channel matrix and performing adequate beamforming which is directed to the receiver.

Figure 13:
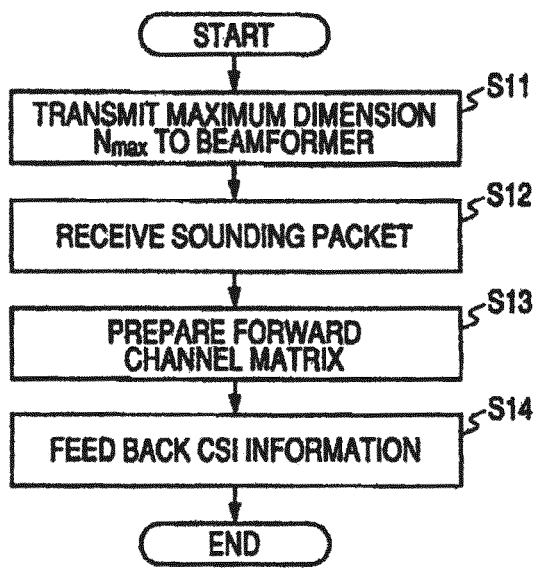
FIG. 13 is a flowchart illustrating a process when the apparatus operates as the beamformer on the basis of the explicit feedback procedure.
Figure 14:
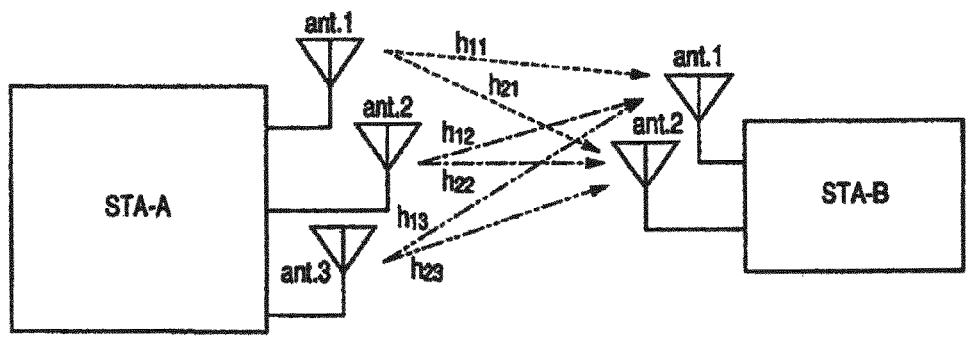
FIG. 14 is a view showing a state where a beamformee estimates a channel matrix excited by a training signal transmitted from a beamformer.
Figure 15:
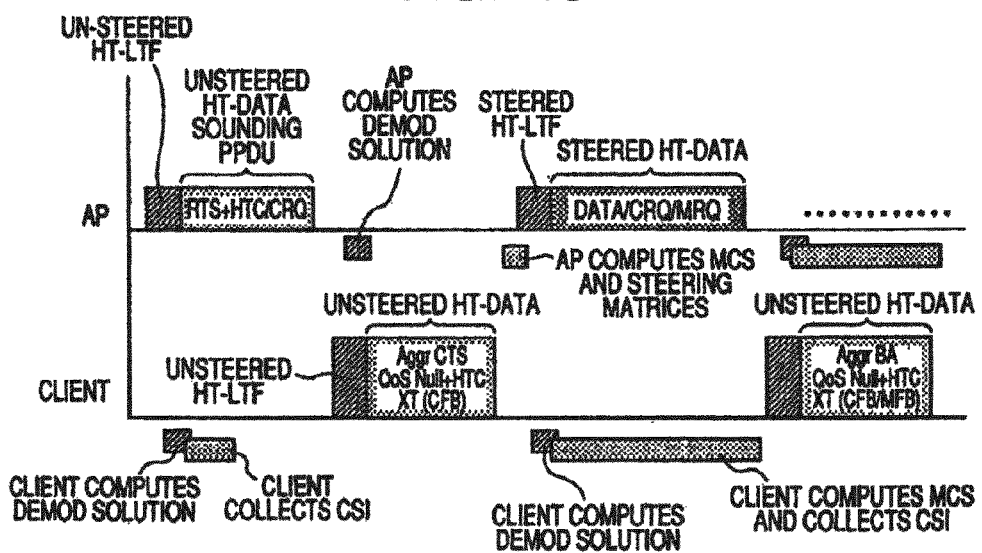
FIG. 15 is a view showing a frame exchange procedure for transmitting beamforming from an access point to a client terminal with the explicit feedback.
Figure 22:
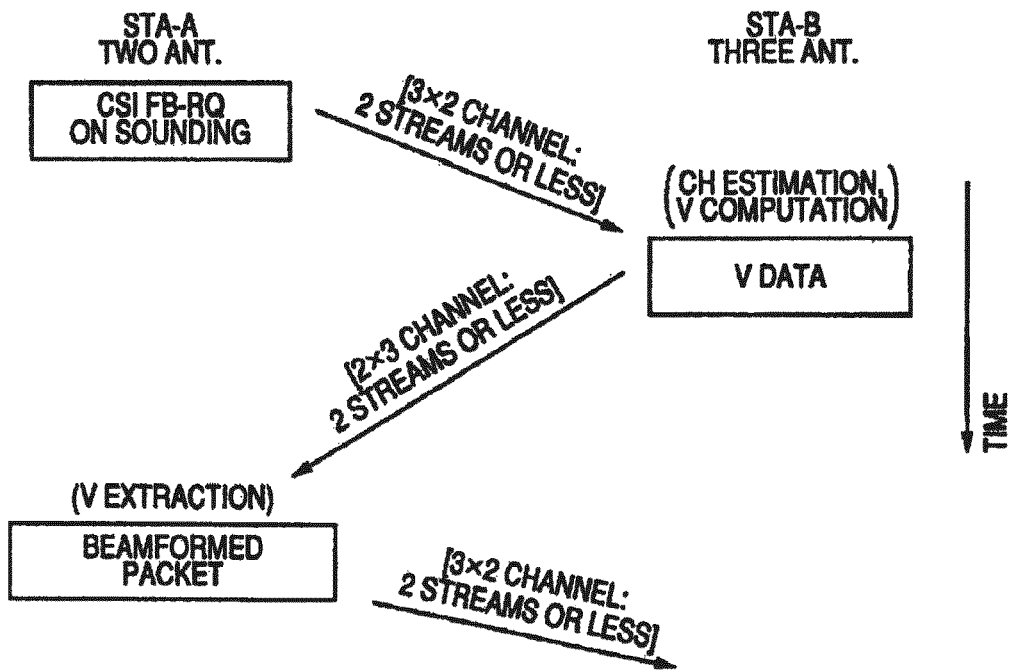
FIG. 22 is a view showing a state where a transmission weight matrix V for beamforming is fed back by the explicit feedback.
Figure 23:
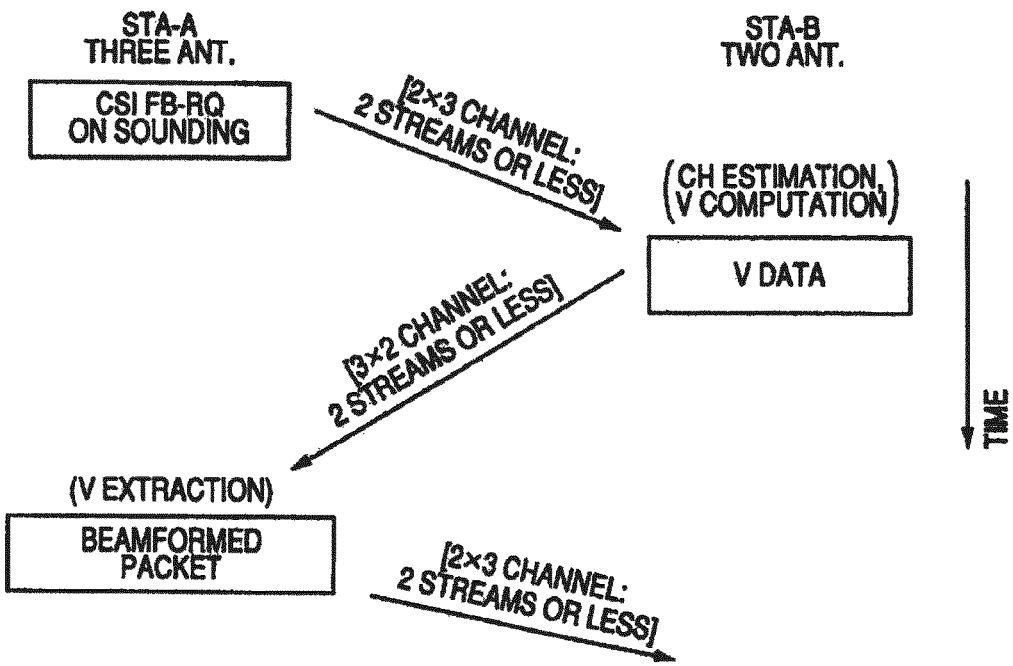
FIG. 23 is a view showing the state where the transmission weight matrix V for beamforming is fed back by the explicit feedback.

FIG. 13 a flowchart illustrating a process when the wireless communication apparatus shown in FIGS. 2 and 3 operates as the receiver, that is, the beamformee, on the basis of the explicit feedback procedure. Here, it is assumed that the number of antennas of the beamformer is N and the number of antennas of the beamformee is M.

First, the maximum spatial dimension number $N_{max}$ of the sounding packet is notified to the initiator which operates as the beamformer (step S11). Hereinafter, it is assumed that $N_{max}=M$. The notification is performed by receiving the management frame such as the message of network association or the beacon including the HT capability field.

Subsequently, when the sounding packet is transmitted from the beamformer, the channel of M spatial dimensions is excited. The beamformee receives it using M antennas (step S12) and estimates the M×M channel matrix (step S13).

The CSI information is prepared from the estimation channel matrix and the packet in which it is included in the data part returns to the beamformer (step S14).

Alternatively, when the feedback of the transmission weight matrix V for beamforming is requested as the sounding packet, in the step S13, the estimation channel matrix is subjected to the singular value decomposition to obtain the transmission weight matrix V for beamforming. In the step S14, the packet in which the coefficient data of the transmission weight matrix V for beamforming is included in the compressed or uncompressed format instead of the CSI information returns to the beamformer.

Since the beamformee surely receives the sounding packet in the range of its own capability, it is possible to reduce the size of the circuit of the channel matrix estimation unit 216a and to realize the low cost or low power consumption of the apparatus.

Although the invention will be described in detail with reference to the specific embodiment, it is apparent to those skilled in the art that the embodiment may be modified or substituted without departing from the scope of the invention.

Although the embodiment in which the invention applies to the MIMO communication system according to the EWC specification in the IEEE 802.11n is described in the present specification, the scope of the invention is not limited to the embodiment. As the MIMO communication system using the stream which is spatially multiplexed from a first terminal including N antennas to a second terminal including M antennas, it is possible to suitably apply the invention to various types of communication systems in which the beamformer performs the beamforming using the channel information fed back from the beamformee.

Although the embodiment which is applied to the IEEE 802.11n which is extension standard of the IEEE 802.11 is described in the present specification, the invention is not limited to the embodiment. The invention is applicable to a variety of wireless communication systems using an MIMO communication method such as a mobile WiMax (Worldwide Interoperability for Microwave) based on the IEEE 802.16e, the IEEE 802.20 which is a high-speed wireless communication standard for a mobile object, the IEEE 802.15.3c which is a high-speed wireless PAN (Personal Area Network) using 60 GHz (milliwave) band, a wireless HD (High Definition) which transmitting an uncompressed HD image using wireless transmission of 60 GHz (milliwave) band, and a fourth generation (4G) mobile telephone.

The invention is disclosed as an exemplary aspect and the contents described in the present specification are restrictively analyzed. The scope of the invention is defined by claims.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device for wireless communication, the electronic device comprising:
   circuitry configured to:
   receive a beamformee capability including a maximum number of space time streams, the beamformee capability being included in a capabilities information field defined in wireless network standard IEEE 802.11;
   receive feedback information generated based at least in part on a channel matrix, the channel matrix being estimated at a beamformee;
   set a transmission weight matrix for beamforming based at least in part on the received feedback information; and
   perform beamforming transmission using the set transmission weight matrix.

2. The electronic device of claim 1, wherein the capabilities information field is present in a management frame.

3. The electronic device of claim 2, wherein the management frame includes a beacon signal, a measure pilot, an association response, a re-association response, and/or a probe response.

4. The electronic device of claim 1, wherein the maximum number of space time streams indicates a number of rows or columns of a MIMO (multiple-input multiple-output) channel matrix for the wireless communication.

5. The electronic device of claim 4, wherein the channel state information is estimated as a channel state information matrix, a number of columns of the channel state information matrix being equal to or less than the number of columns of the MIMO channel matrix.

6. The electronic device of claim 1, further configured to:
   transmit a sounding data unit, the sounding data unit being generated based at least in part on the beamformee capability.

7. The electronic device of claim 6, wherein a length of the sounding data unit is equal to or less than a number indicated by the beamformee capability.

8. The electronic device of claim 7, wherein the sounding data unit is generated as a staggered sounding packet.

9. The electronic device of claim 1, wherein the feedback information is compressed at the beamformee.

10. The electronic device of claim 1, wherein the beamformee capability is represented by two bits, the two bits being located adjacent to a bit field including an information of maximum beamformer capability.

11. The electronic device of claim 1, wherein the capability information field further includes both implicit beamforming capability information and explicit beamforming capability information.

12. The electronic device of claim 1, further comprising:
   a plurality of antennas configured to transmit or receive signals including the beamformee capability.

13. The electronic device of claim 12, wherein a number of the plurality of antennas is two or three.

14. The electronic device of claim 13, further comprising:
   a digital filter unit configured to perform band limitation, a number of the filtering of the digital filter unit being equal to a number of the plurality of antennas.

15. A method for wireless communication, the method comprising:
   receiving a beamformee capability including a maximum number of space time streams, the beamformee capability being included in a capabilities information field defined in wireless network standard IEEE 802.11;
   receiving feedback information generated based at least in part on a channel matrix, the channel matrix being estimated at a beamformee;
   setting a transmission weight matrix for beamforming based at least in part on the received feedback information; and
   performing beamforming transmission using the set transmission weight matrix.

16. The method of claim 15, wherein the capabilities information field is present in a management frame.

17. The method of claim 16, wherein the management frame includes a beacon signal, a measure pilot, an association response, a re-association response, and/or a probe response.

18. The method of claim 15, wherein the maximum number of space time streams indicates a number of rows or columns of a MIMO (multiple-input multiple-output) channel matrix for the wireless communication.

19. The method of claim 18, wherein the channel state information is estimated as a channel state information matrix, a number of columns of the channel state information matrix being equal to or less than the number of columns of the MIMO channel matrix.

20. The method of claim 15, further configured to:
    transmit a sounding data unit, the sounding data unit being generated based at least in part on the beamformee capability.

21. The method of claim 20, wherein a length of the sounding data unit is equal to or less than a number indicated by the beamformee capability.

22. The method of claim 21, wherein the sounding data unit is generated as a staggered sounding packet.

23. The method of claim 15, wherein the feedback information is compressed at the beamformee.

24. The method of claim 15, wherein the beamformee capability is represented by two bits, the two bits being located adjacent to a bit field including an information of maximum beamformer capability.

25. The method of claim 15, wherein the capability information field further includes both implicit beamforming capability information and explicit beamforming capability information.

26. An electronic device for wireless communication, the electronic device comprising:
    circuitry configured to:
    transmit a beamformee capability including a maximum number of space time streams, the beamformee capability being included in a capabilities information field defined in wireless network standard IEEE 802.11;
    estimate a channel matrix;
    transmit feedback information generated based at least in part on the estimated channel matrix; and
    receive a data signal by beamforming using a transmission weight matrix generated based at least in part on the feedback information.

27. The electronic device of claim 26, wherein the capabilities information field is present in a management frame.

28. The electronic device of claim 27, wherein the management frame includes a beacon signal, a measure pilot, an association response, a re-association response, and/or a probe response.

29. The electronic device of claim 26, wherein the maximum number of space time streams indicates a number of rows or columns of a MIMO (multiple-input multiple-output) channel matrix for the wireless communication.

30. The electronic device of claim 29, wherein the channel state information is estimated as a channel state information matrix, a number of columns of the channel state information matrix being equal to or less than the number of columns of the MIMO channel matrix.

31. The electronic device of claim 26, further configured to:
    receive a sounding data unit, the sounding data unit being generated based at least in part on the beamformee capability.

32. The electronic device of claim 31, wherein a length of the sounding data unit is equal to or less than a number indicated by the beamformee capability.

33. The electronic device of claim 32, wherein the sounding data unit is generated as a staggered sounding packet.

34. The electronic device of claim 26, wherein the feedback information is compressed at the beamformee.

35. The electronic device of claim 26, wherein the beamformee capability is represented by two bits, the two bits being located adjacent to a bit field including an information of maximum beamformer capability.

36. The electronic device of claim 26, wherein the capability information field further includes both implicit beamforming capability information and explicit beamforming capability information.

37. The electronic device of claim 26, further comprising:
    a plurality of antennas configured to transmit or receive signals including the beamformee capability.

38. The electronic device of claim 37, wherein a number of the plurality of antennas is two or three.

39. The electronic device of claim 38, further comprising:
    a digital filter unit configured to perform band limitation, a number of the filtering of the digital filter unit being equal to a number of the plurality of antennas.

* * * * *